United States Patent
Fukuyoshi

(10) Patent No.: US 9,435,294 B2
(45) Date of Patent: Sep. 6, 2016

(54) ENGINE APPARATUS

(71) Applicant: YANMAR CO., LTD., Osaka (JP)

(72) Inventor: Shinya Fukuyoshi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/431,109

(22) PCT Filed: Sep. 26, 2013

(86) PCT No.: PCT/JP2013/076136
§ 371 (c)(1),
(2) Date: Mar. 25, 2015

(87) PCT Pub. No.: WO2014/051001
PCT Pub. Date: Apr. 3, 2014

(65) Prior Publication Data
US 2015/0240749 A1    Aug. 27, 2015

(30) Foreign Application Priority Data

Sep. 28, 2012    (JP) .................................. 2012-216522

(51) Int. Cl.
| | |
|---|---|
| *F01N 3/00* | (2006.01) |
| *F02M 25/07* | (2006.01) |
| *F02B 67/00* | (2006.01) |
| *F01N 13/18* | (2010.01) |

(Continued)

(52) U.S. Cl.
CPC .......... *F02M 25/0703* (2013.01); *F01N 3/021* (2013.01); *F01N 3/18* (2013.01); *F01N 13/008* (2013.01); *F01N 13/1805* (2013.01); *F01N 13/1838* (2013.01); *F02B 67/00* (2013.01); *F01N 2250/02* (2013.01); *F01N 2450/24* (2013.01); *F01N 2560/06* (2013.01); *F01N 2560/08* (2013.01)

(58) Field of Classification Search
USPC .......... 60/272, 276, 295, 299, 300, 322, 324
See application file for complete search history.

(56) References Cited

U.S. PATENT DOCUMENTS

| | | | |
|---|---|---|---|
| 7,192,463 B2 * | 3/2007 | Shutty | F01N 13/008 174/50 |
| 7,966,979 B2 * | 6/2011 | Olsen | F01N 13/00 123/195 A |

(Continued)

FOREIGN PATENT DOCUMENTS

| | | |
|---|---|---|
| JP | 9-207887 | 8/1997 |
| JP | 2000-145430 | 5/2000 |

(Continued)

*Primary Examiner* — Binh Q Tran
(74) *Attorney, Agent, or Firm* — Norris McLaughlin & Marcus, P.A.

(57) ABSTRACT

An object in mounting an exhaust gas purifier to an engine as a component of the engine is to prevent a plurality of detection members, which are configured to detect a state of the exhaust gas purifier, from being disadvantageously affected by the heat of the engine and the exhaust gas purifier. An engine apparatus includes the exhaust gas purifier configured to purify exhaust gas from the engine. The exhaust gas purifier is mounted above the engine through a mounting base. A heat conductive bracket is disposed on an outer surface of the exhaust gas purifier that is closer to the engine. The plurality of detection members, which are configured to detect of the state of the exhaust gas purifier, are attached to an upper surface and a side surface of the heat conductive bracket.

4 Claims, 18 Drawing Sheets

(51) Int. Cl.
*F01N 13/00* (2010.01)
*F01N 3/021* (2006.01)
*F01N 3/18* (2006.01)

(56) References Cited

U.S. PATENT DOCUMENTS

| | | | | |
|---|---|---|---|---|
| 8,418,448 B2 * | 4/2013 | Kamata | ................ | B60K 5/1208 60/299 |
| 8,580,003 B2 * | 11/2013 | Mitsuda | .................... | F01N 1/10 428/180 |
| 8,904,766 B2 * | 12/2014 | Saito | ..................... | F01N 3/0335 60/299 |
| 8,915,071 B2 * | 12/2014 | Mitsuda | .................. | F01N 13/00 60/285 |

FOREIGN PATENT DOCUMENTS

| | | | | |
|---|---|---|---|---|
| JP | 2000-282961 | | 10/2000 | |
| JP | 2003-027922 | | 1/2003 | |
| JP | 2006-207403 | | 8/2006 | |
| JP | 2008-082201 | | 4/2008 | |
| JP | WO 2011/099527 | * | 8/2011 | ........... F01N 13/008 |
| JP | 2012-072722 | | 4/2012 | |

* cited by examiner

ENGINE APPARATUS

TECHNICAL FIELD

The present invention relates to an engine apparatus mounted on a working machine such as a construction civil-engineering machine, an agricultural machine, and an engine generator.

BACKGROUND OF THE INVENTION

Recently, high-order emission control has been applied to diesel engines (hereinafter simply referred to as engines). Accordingly, it has been desired to mount an exhaust gas purifier to purify atmospheric pollutants contained in exhaust gas on a working machine such as a construction civil-engineering machine, an agricultural machine, and an engine generator on which an engine is mounted. As an exhaust gas purifier, a diesel particulate filter (hereinafter referred to as DPF) to collect particulate matter and such substances contained in exhaust gas has been known (see patent documents 1 to 3). Also, as a countermeasure to take against exhaust gas, there has been known a technique of providing an EGR device (exhaust gas recirculation device) to make part of exhaust gas flow back to the intake side. Thus, combustion temperature is suppressed to a low level to decrease an amount of NOx contained in exhaust gas (see patent document 4). These exhaust gas countermeasure devices are electronically controlled utilizing electronic components such as various sensors and controllers in order to effectively implement functions of the exhaust gas countermeasure devices.

RELATED PATENT DOCUMENTS

Patent Document 1: Japanese Unexamined Patent Application Publication No. 2000-145430.
Patent Document 2: Japanese Unexamined Patent Application Publication No. 2003-27922.
Patent Document 3: Japanese Unexamined Patent Application Publication No. 2008-82201.
Patent Document 4: Japanese Unexamined Patent Application Publication No. 2000-282961.

An engine including such an exhaust gas countermeasure device as described above is applied to a working machine, for example, a construction civil-engineering machine. In this case, not only the engine and the exhaust gas countermeasure device but also various other components including a radiator, a battery, and electronic parts in relation to the exhaust gas countermeasure device should be crammed in a limited narrow mounting space.

However, in the mounting space in the working machine, heat of the engine when driven makes temperature of the exhaust gas countermeasure device rather high as well as temperature of the engine itself. Consequently, the electronic parts generally susceptible to heat should not be affected disadvantageously by the heat of the engine and the exhaust gas countermeasure device. In view of this, it is necessary to take into consideration an appropriate arrangement configuration and a suitable cooling configuration of the electronic components. It is also necessary to prevent coupling of the above-described electronic components from loosening or breaking due to vibration caused at the time of traveling or working of the working machine.

SUMMARY OF THE INVENTION

It is a technical object of the present invention to provide an engine apparatus improved in view of the above-described current circumstances.

According to the invention, an engine apparatus includes an exhaust gas purifier configured to purify exhaust gas from an engine and mounted above the engine through a mounting base. A heat conductive bracket is disposed on an outer surface of the exhaust gas purifier that is closer to the engine. A plurality of detection members configured to detect a state of the exhaust gas purifier are attached to an upper surface and a side surface of the heat conductive bracket.

According to the invention, in the engine apparatus, a sensor fastening portion is integrally formed on a portion of a flange disposed on the exhaust gas purifier. The heat conductive bracket is detachably attached to the sensor fastening portion.

According to the invention, in the engine apparatus, the sensor fastening portion of the flange protrudes in a direction away from the outer surface of the exhaust gas purifier. The sensor fastening portion and the heat conductive bracket are fastened together by fastening bolts, According to the invention, in the engine apparatus, heat insulating and vibration isolating sheets are interposed between the detection members and the heat conductive bracket.

EFFECTS OF THE INVENTION

According to the invention, the engine apparatus includes the exhaust gas purifier configured to purify exhaust gas from the engine and mounted above the engine through the mounting base. The heat conductive bracket is disposed on the outer surface of the exhaust gas purifier that is closer to the engine. The plurality of detection members configured to detect a state of the exhaust gas purifier are attached to the upper surface and the side surface of the heat conductive bracket. Consequently, the plurality of detection members such as a pressure sensor and a temperature sensor are concentrated on the outer surface of the exhaust gas purifier that is closer to the engine. This facilitates concentration of wiring with respect to the plurality of detection members. Also, wiring work is readily performed. The bracket to which the plurality of detection members are attached has heat conductivity to serve to decrease an influence of radiant heat.

According to the invention, the sensor fastening portion is integrally formed on the portion of the flange disposed on the exhaust gas purifier. The heat conductive bracket is detachably attached to the sensor fastening portion. Consequently, the plurality of detection members are supported on the highly rigid flange through the heal conductive bracket so as to reduce vibration of the plurality of detection members. Also, the plurality of detection members are prevented from coming off. In attachment of the plurality of detection members, the plurality of detection members are attached to the heat conductive bracket in advance, and then, the heat conductive bracket is fastened to the flange. This improves assembling workability of the plurality of detection members.

According to the invention, the sensor fastening portion of the flange protrudes in the direction away from the outer surface of the exhaust gas purifier. The sensor fastening portion and the heat conductive bracket are fastened together by the fastening bolts. Therefore, the heat conductive bracket is not in contact with the outer surface of the exhaust gas purifier and is kept away from the outer surface of the exhaust gas purifier. This prevents disadvantageous influence of heat from the exhaust gas purifier with respect to the sensor bracket and at the same time the plurality of detection members.

According to the invention, the heat insulating and vibration isolating sheets are interposed between the detection members and the heat conductive bracket. The existence of the heat insulating and vibration isolating sheets further reduces the influence of radiant heat on the plurality of detection members. This also suppresses vibration of the plurality of detection members. Thus, the possibility of disorder owing to heat and falls of wiring is prevented,

DESCRIPTION OF THE PREFERRED EMBODIMENTS

Figure 1:
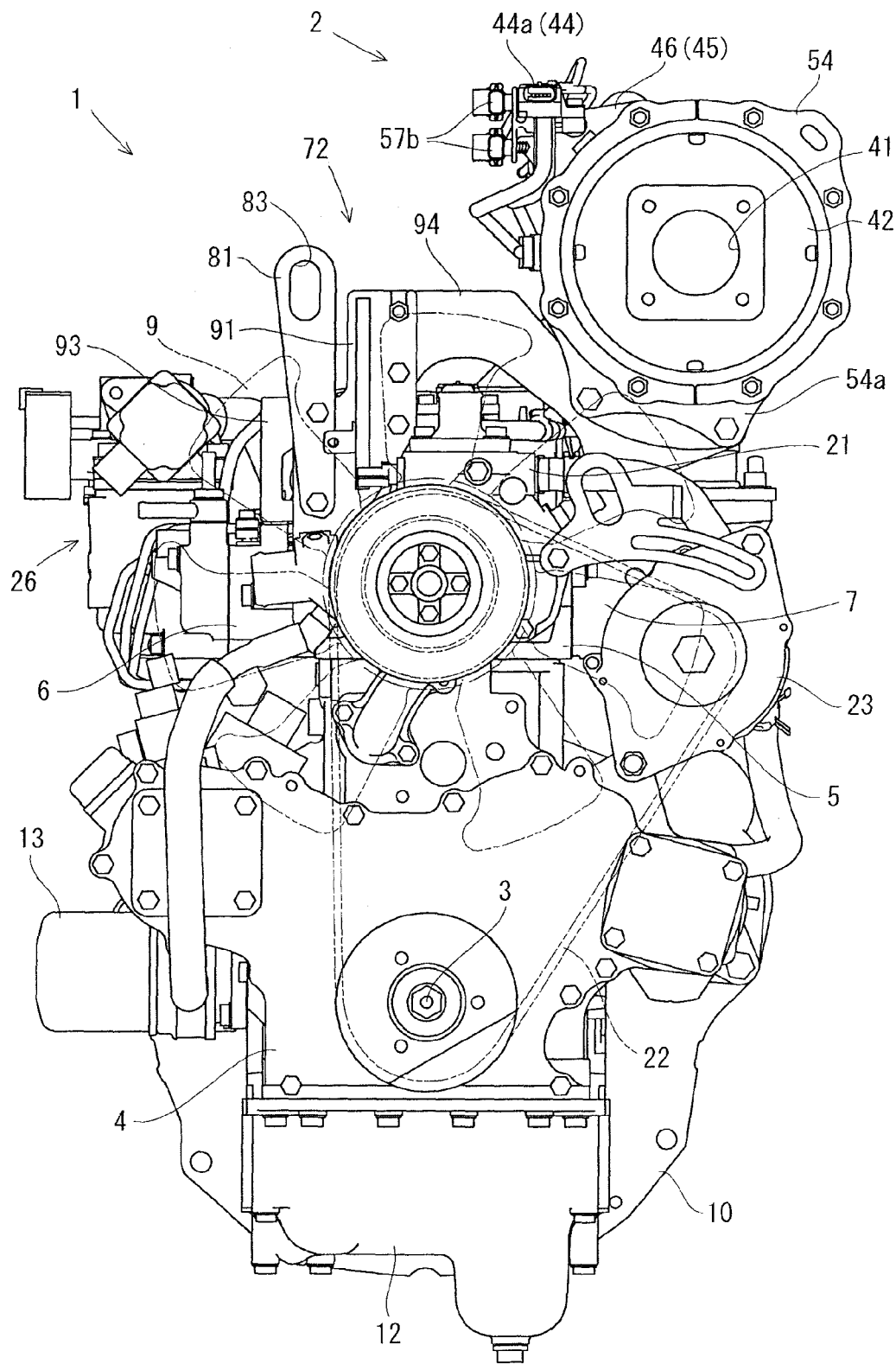
FIG. 1 is a front view of an engine according to an embodiment.
Figure 2:
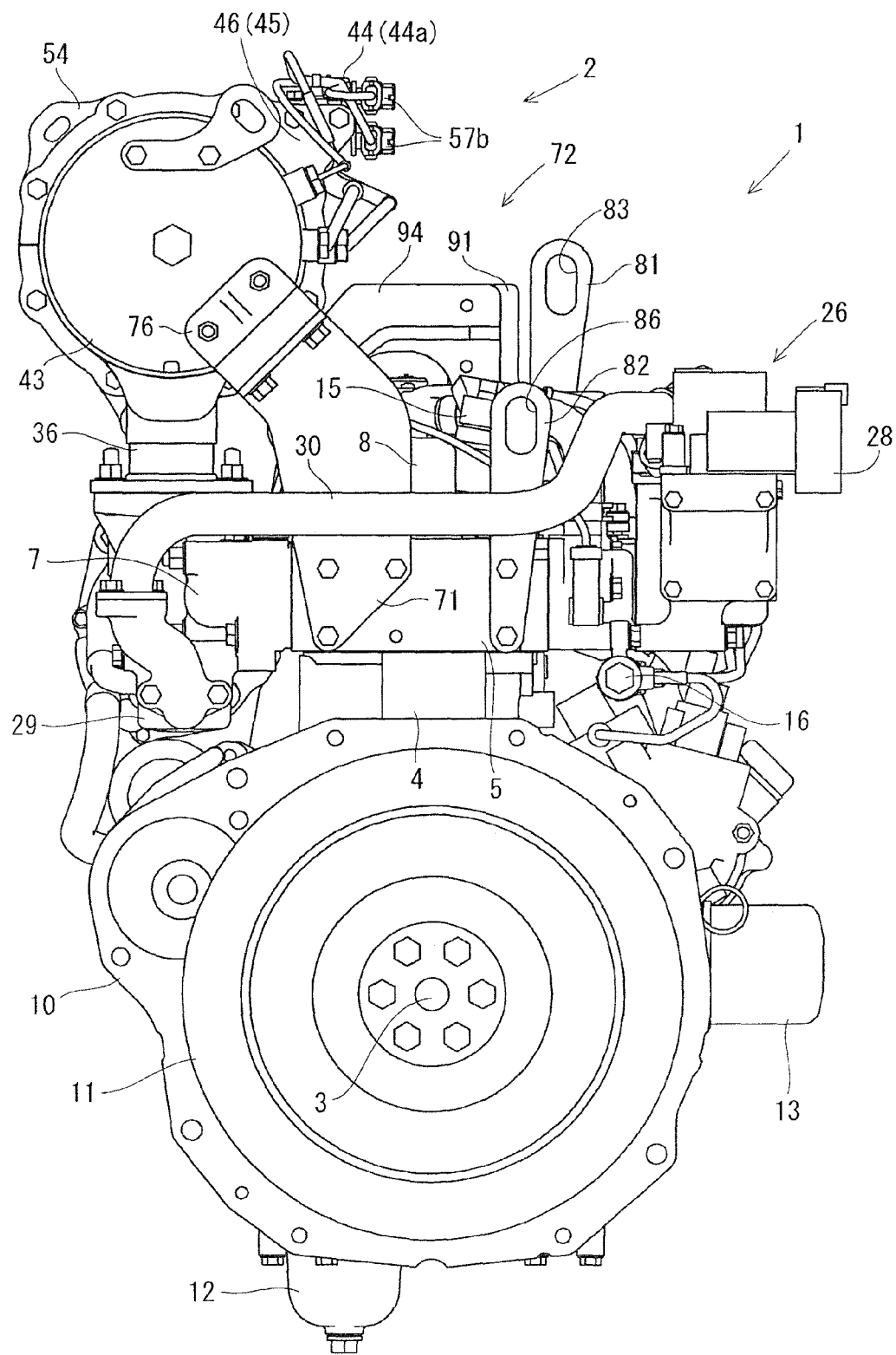
FIG. 2 is a rear view of the engine.
Figure 3:
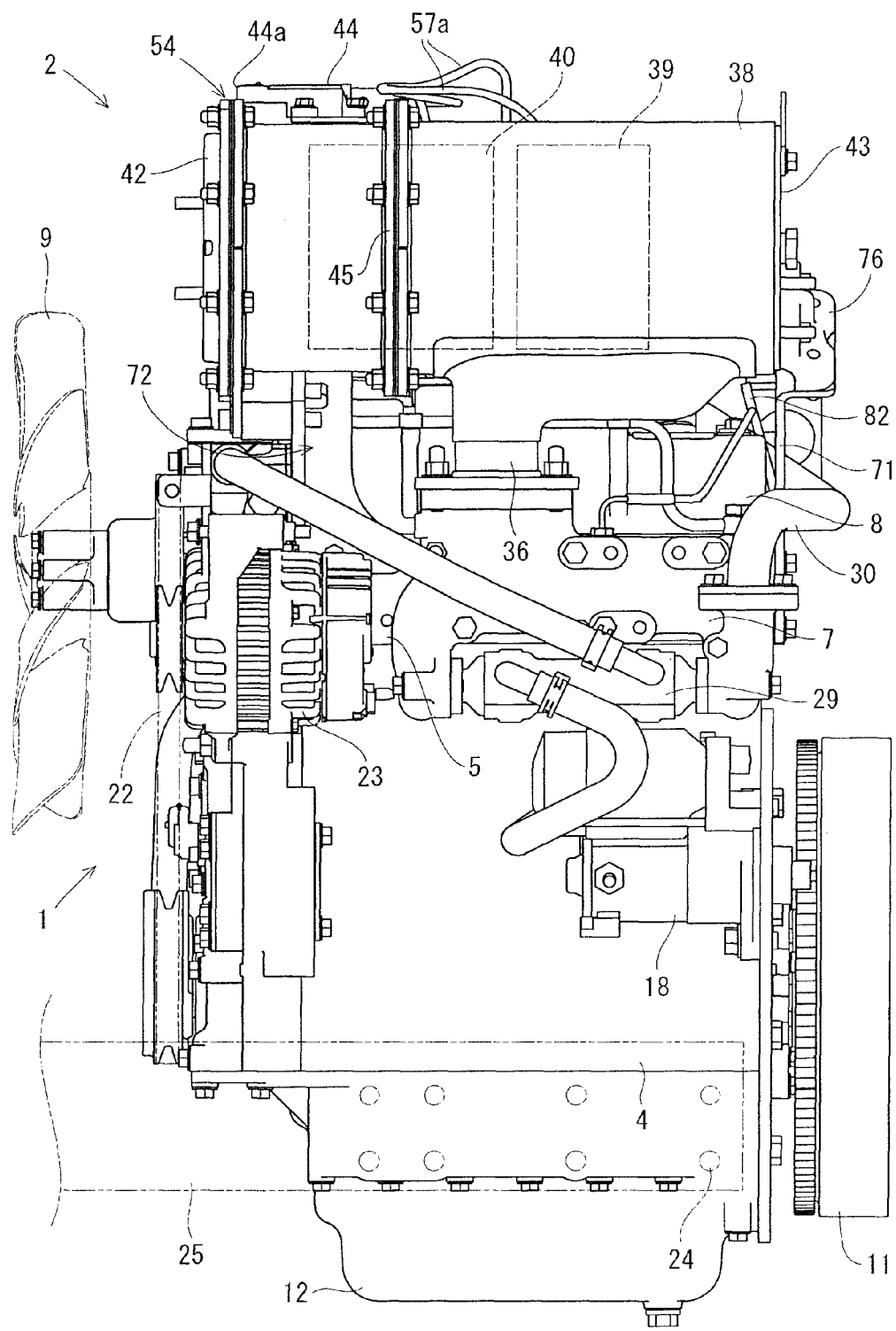
FIG. 3 is a left side view of the engine.
Figure 4:
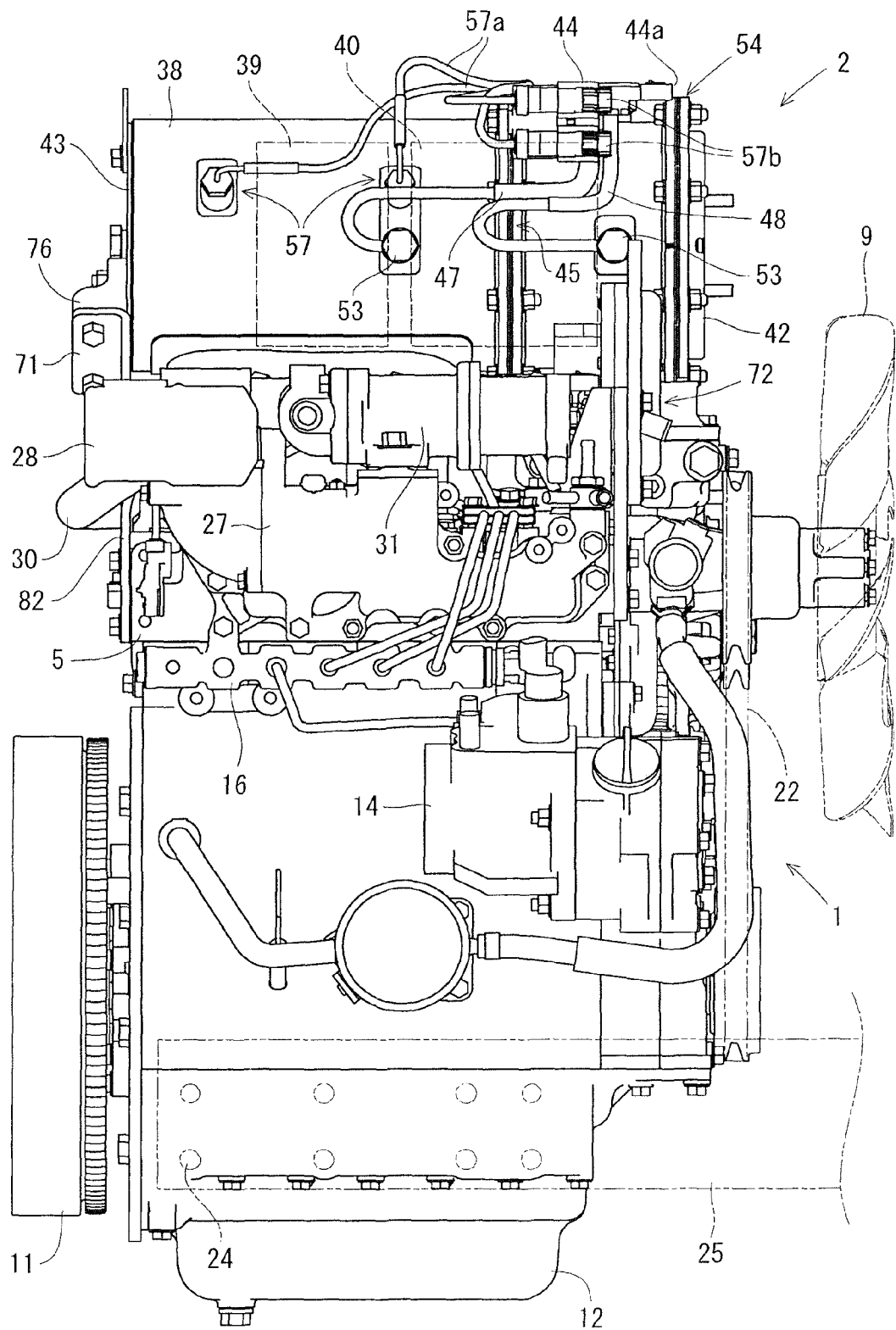
FIG. 4 is a right side view of the engine.
Figure 5:
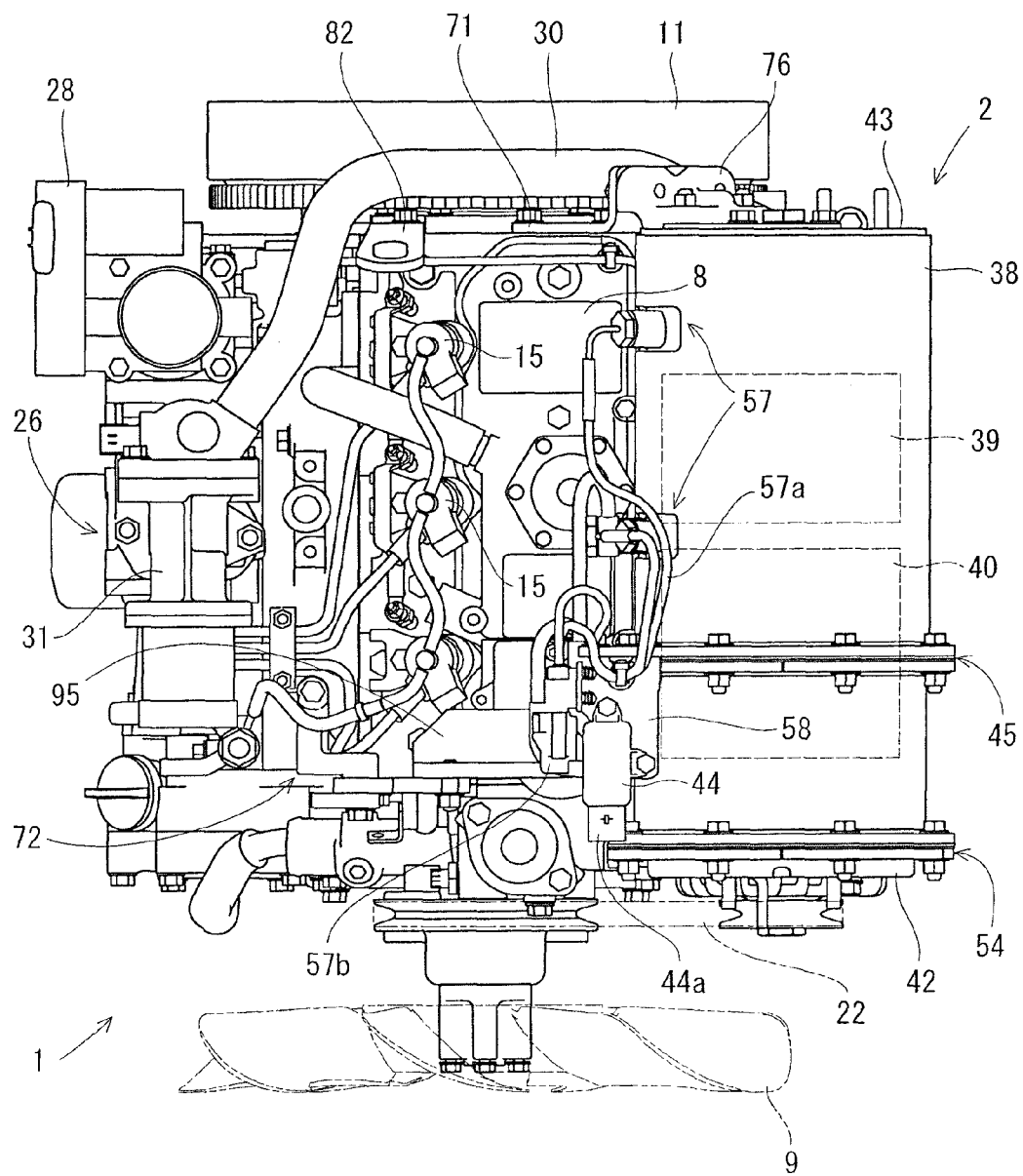
FIG. 5 is a plan view of the engine.
Figure 6:
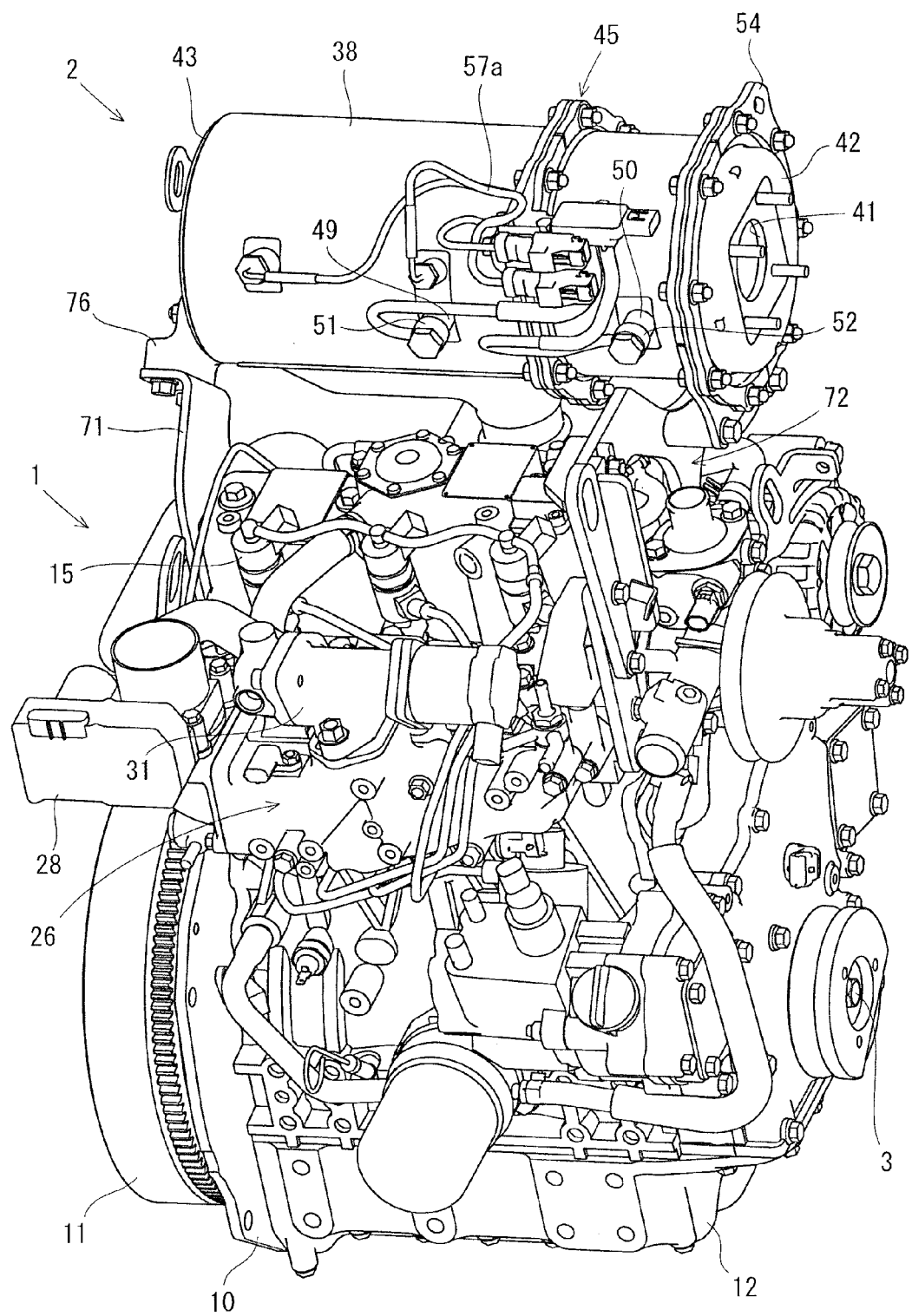
FIG. 6 is an upper-left perspective view of the engine.
Figure 7:
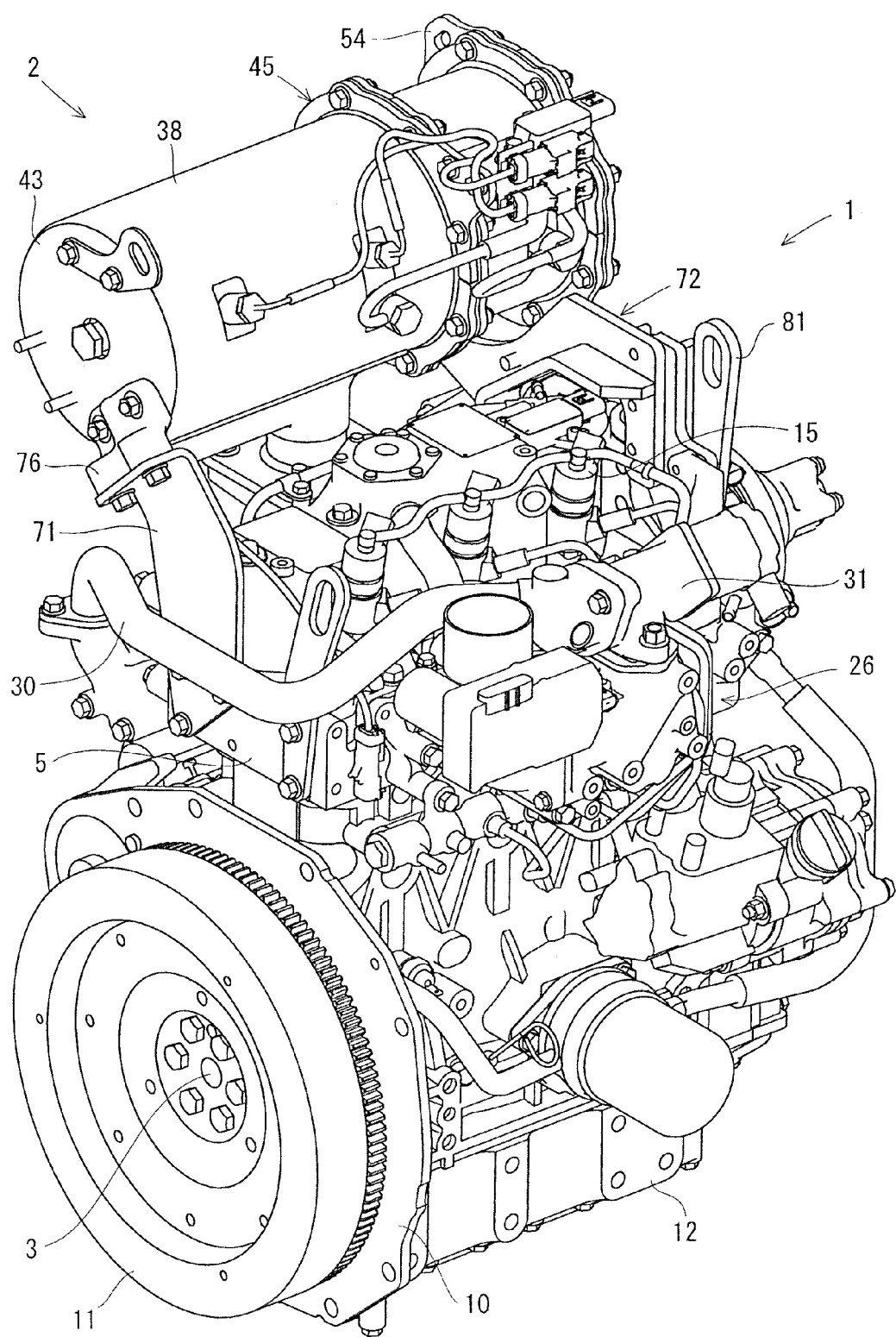
FIG. 7 is a right rear perspective view of the engine.
Figure 8:
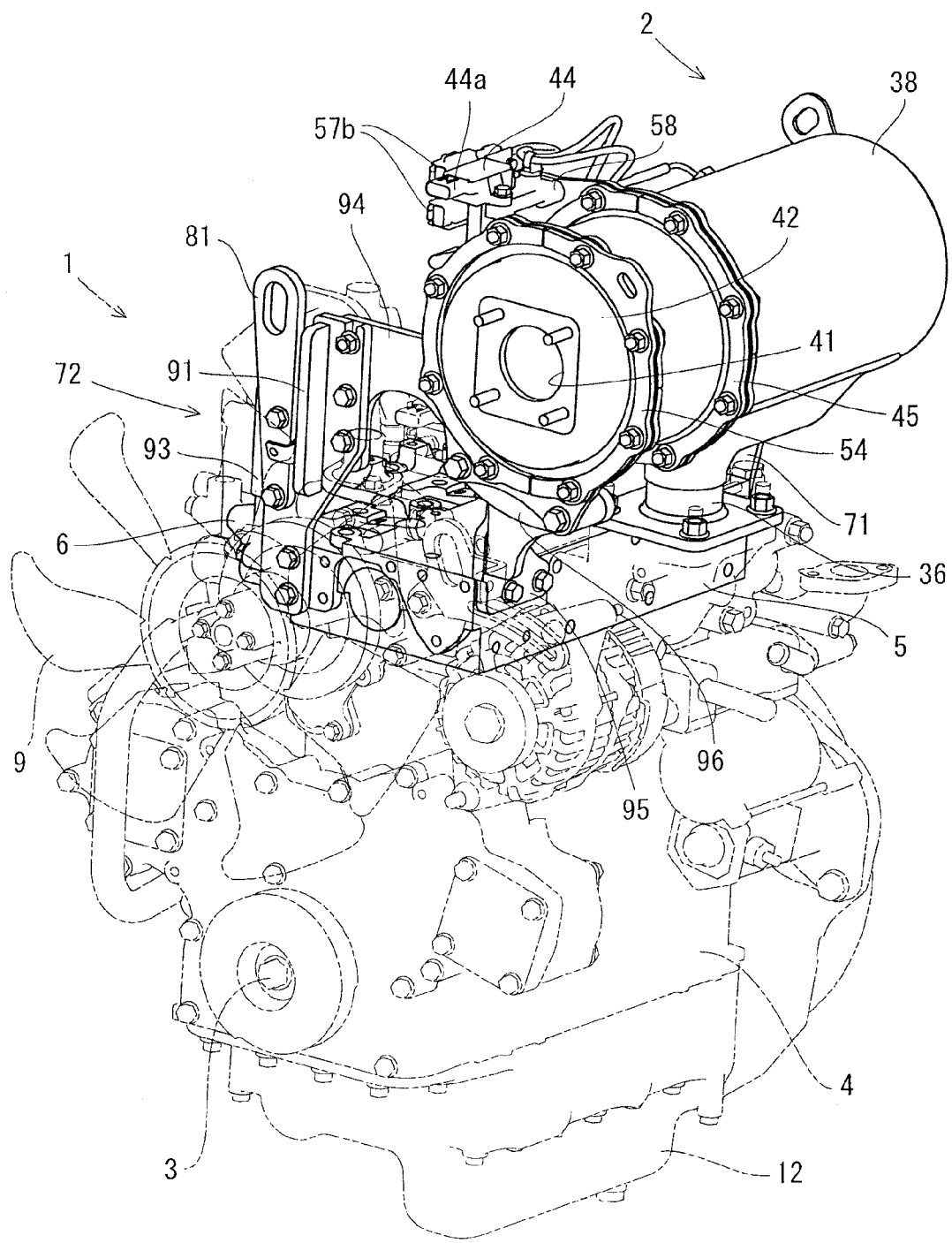
FIG. 8 is an upper-left front perspective view of a cylinder head and an exhaust gas purifier, illustrating a positional relationship between the cylinder head and the exhaust gas purifier.
Figure 9:
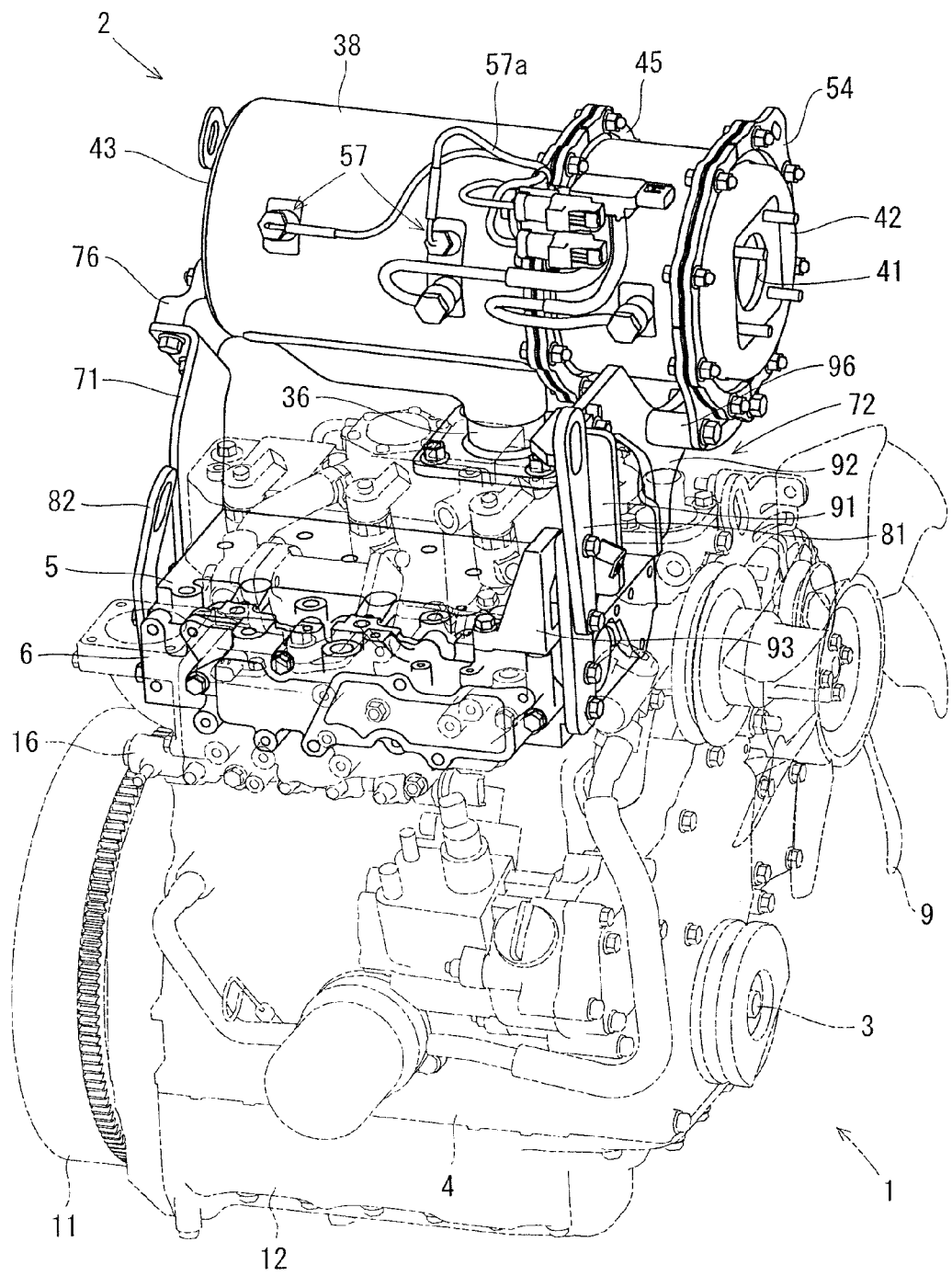
FIG. 9 is an upper-right perspective view of the cylinder head and the exhaust gas purifier, illustrating a positional relationship between the cylinder head and the exhaust gas purifier.
Figure 10:
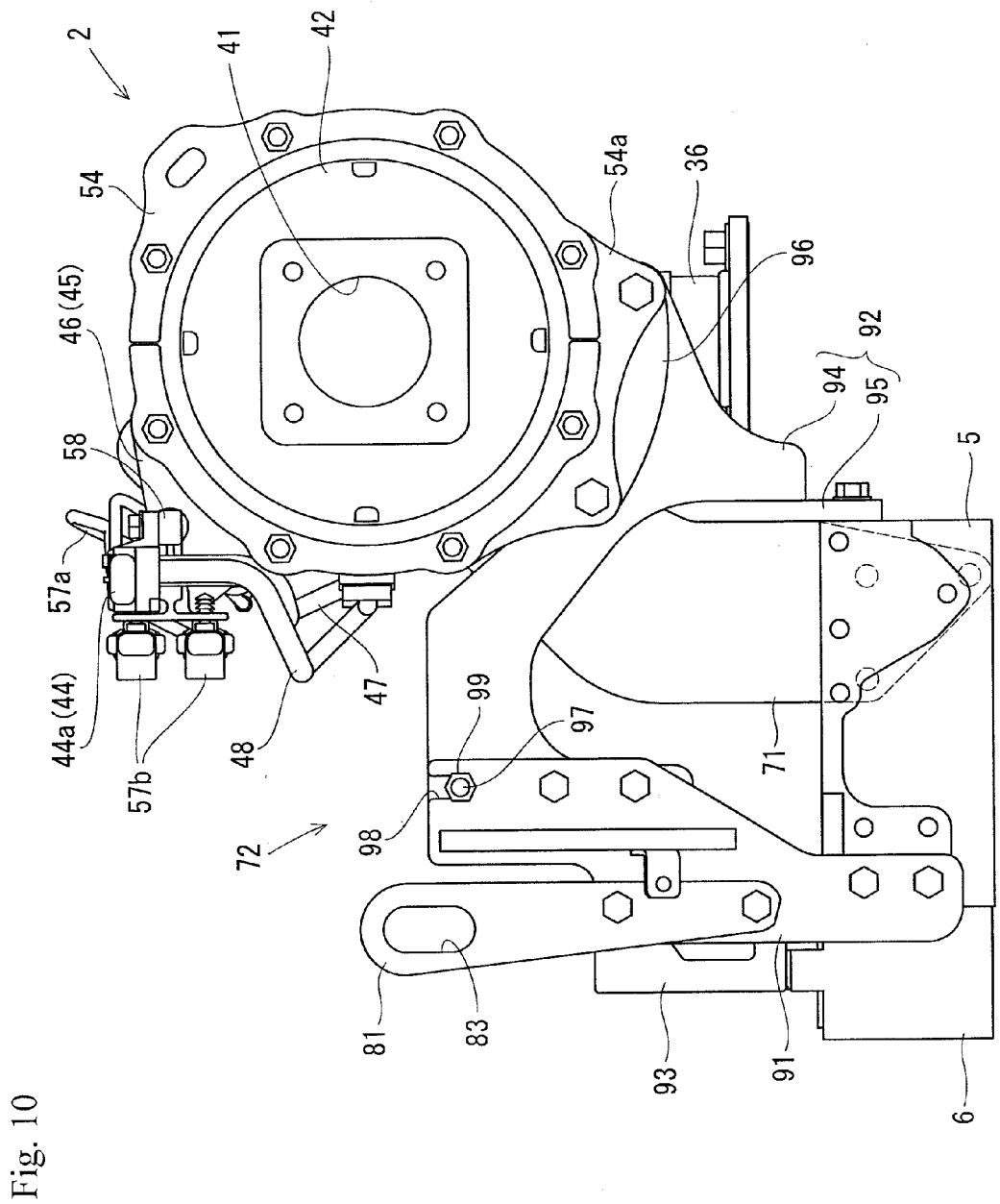
FIG. 10 is an enlarged front view of brackets bodies, the exhaust gas purifier, and the cylinder head, illustrating a state of attachment of the bracket bodies and the exhaust gas purifier to the cylinder head.
Figure 11:
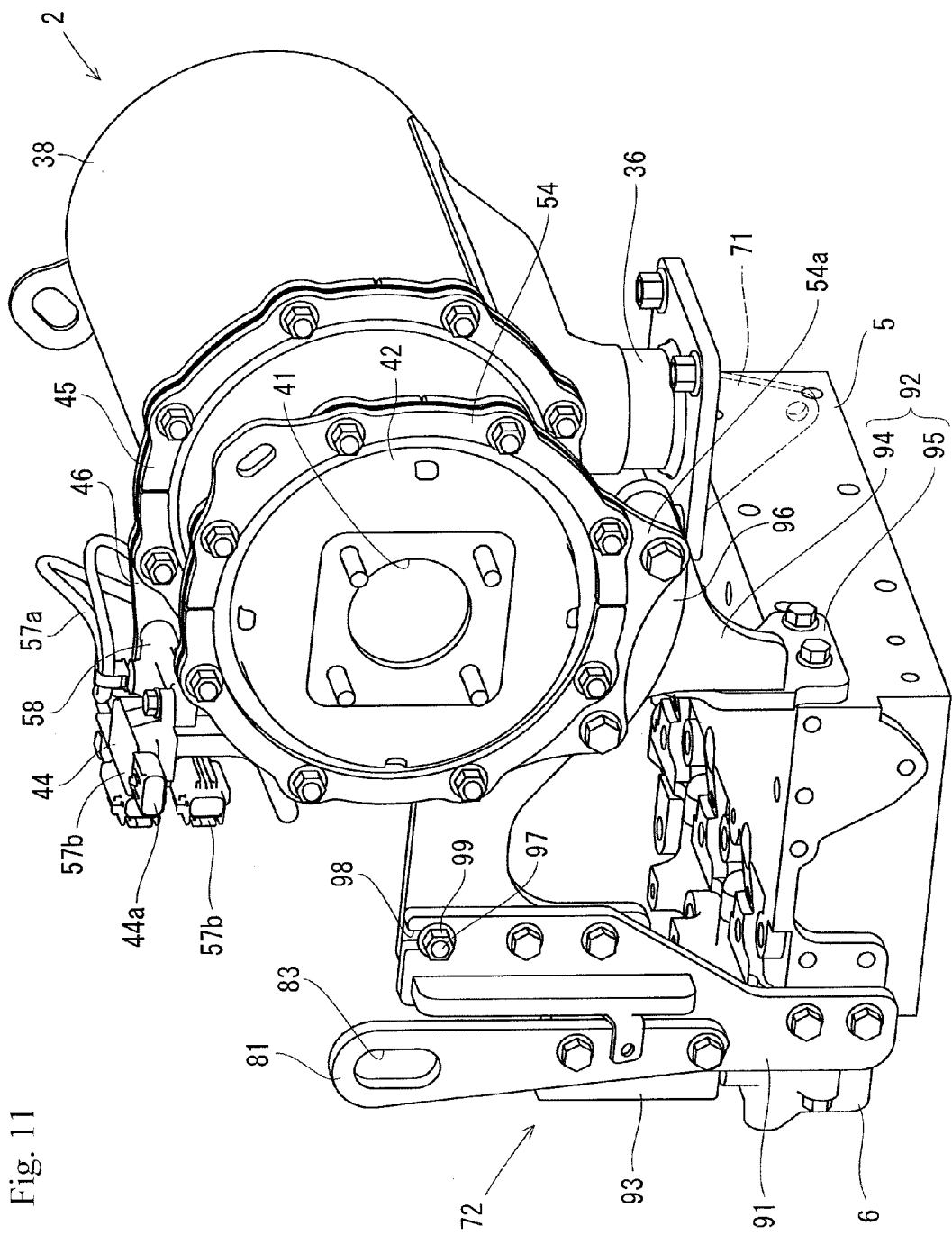
FIG. 11 is an enlarged left front perspective view of the bracket bodies, the exhaust gas purifier, and the cylinder head, illustrating the state of attachment of the bracket bodies and the exhaust gas purifier to the cylinder head.
Figure 12:
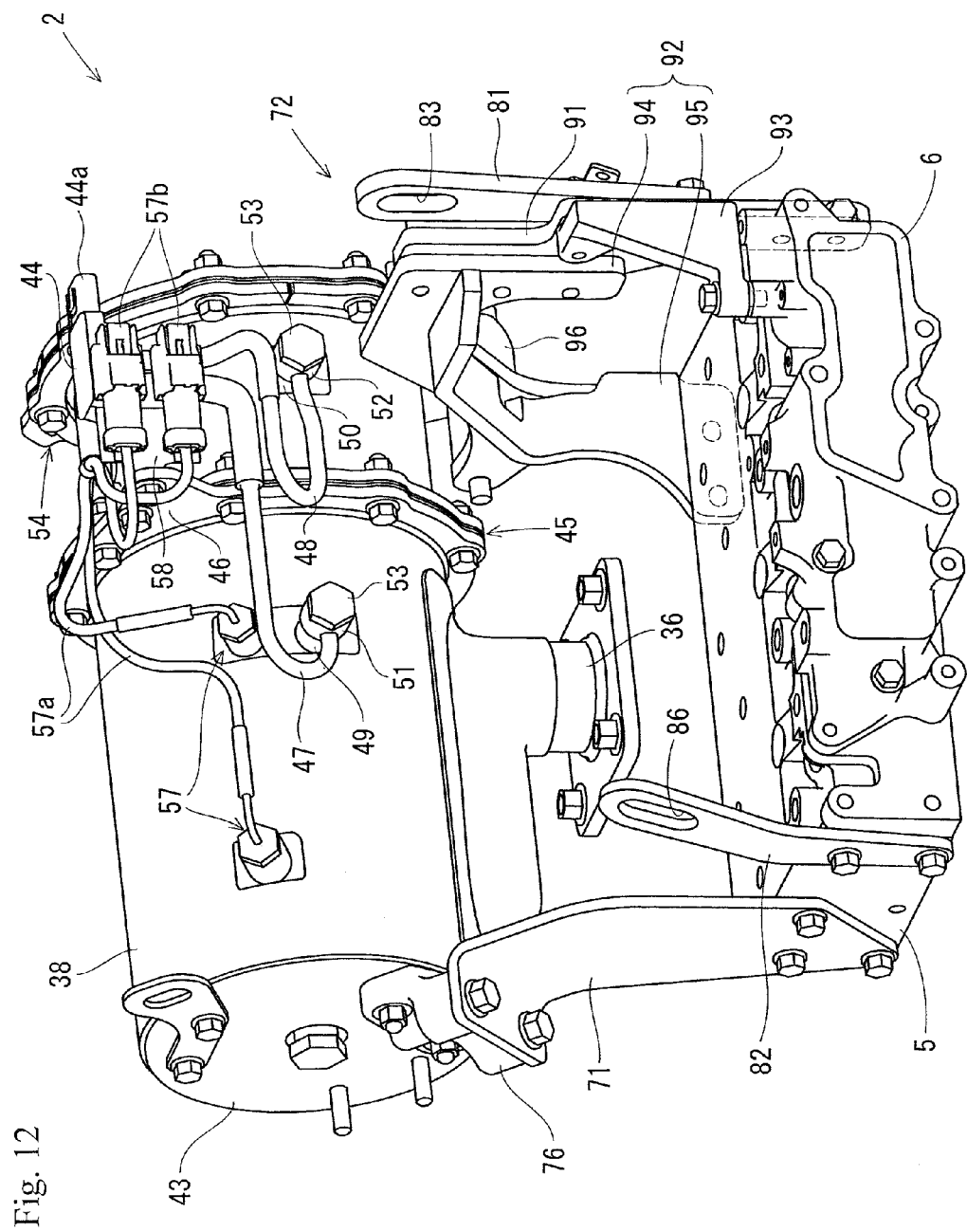
FIG. 12 is an enlarged right rear perspective view of the bracket bodies, the exhaust gas purifier, and the cylinder head, illustrating the state of attachment of the bracket bodies and the exhaust gas purifier to the cylinder head.
Figure 13:
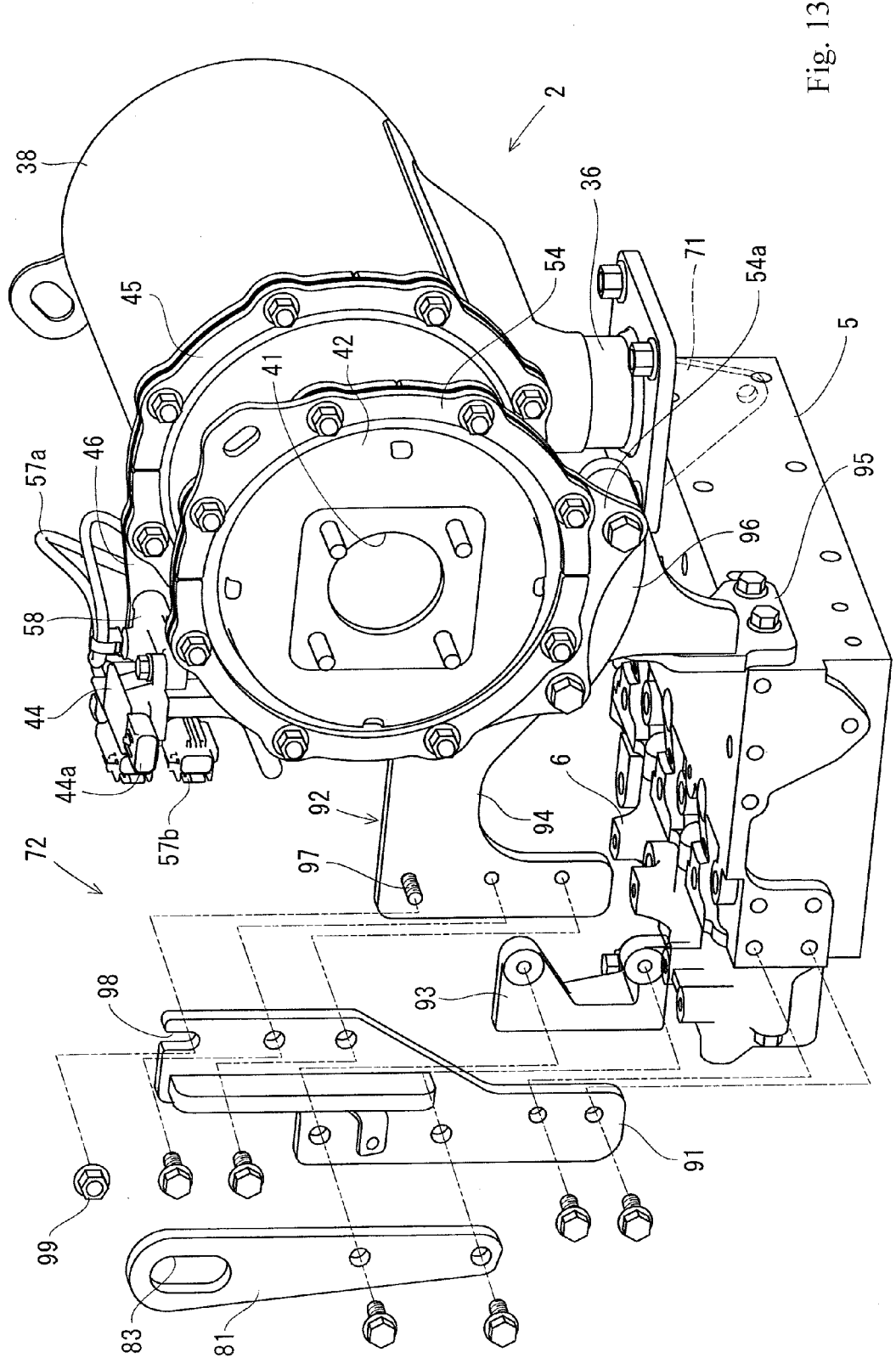
FIG. 13 is an exploded perspective view of an intake-side bracket.
Figure 14:
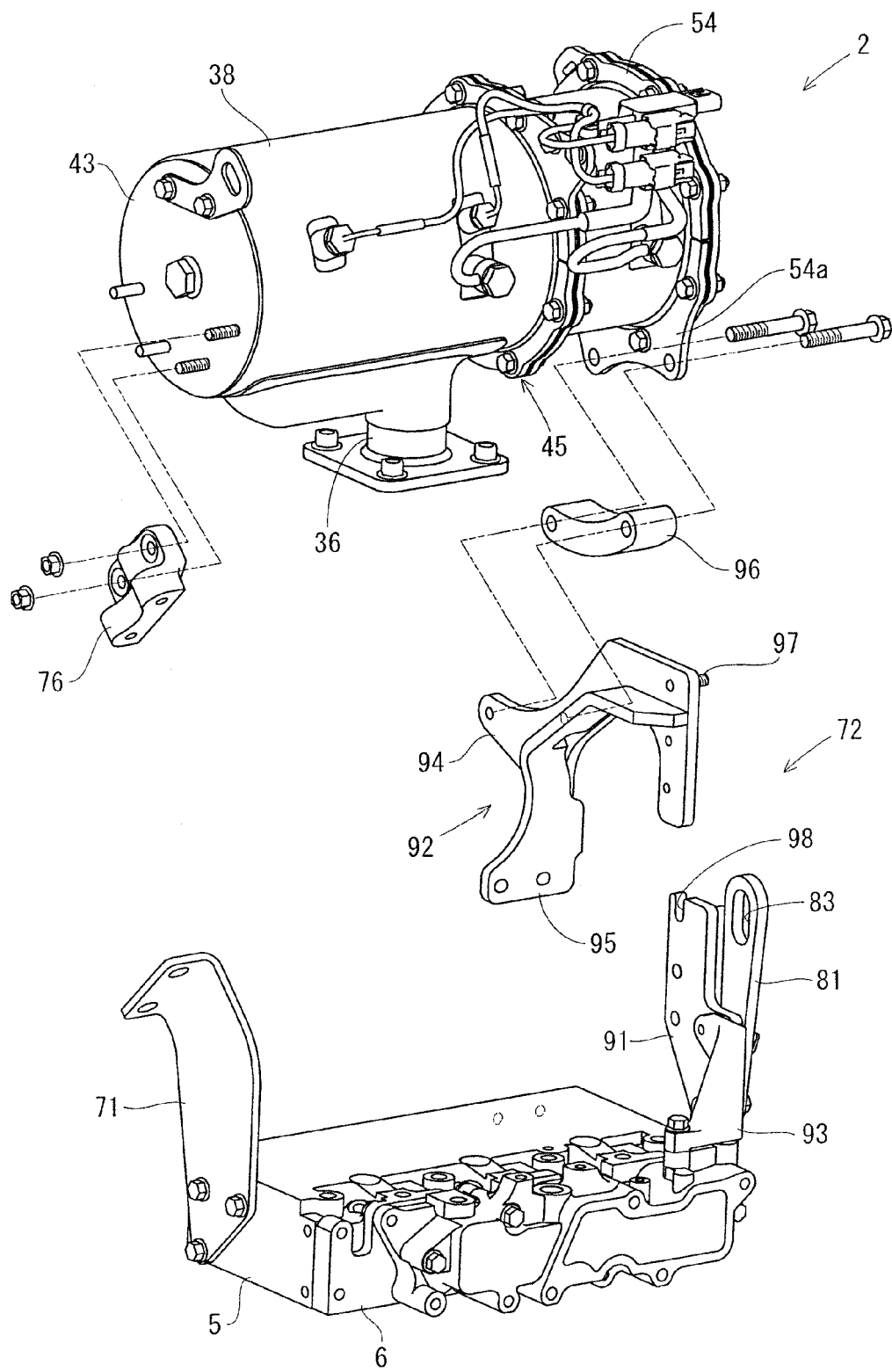
FIG. 14 is an exploded perspective view of the whole bracket bodies.

An embodiment of the present invention will be described below with reference to the drawings. First, referring to FIGS. 1 to 7, description will be made on a schematic configuration of a common-rail engine 1 in this embodiment. It should be noted that in the following description, both sides in an axial direction of an output shaft 3 (portions on both sides of the output shaft 3) will be referred to as left and right. A side on which a cooling fan 9 is disposed will be referred to as the front side. A side on which a flywheel 11 is disposed will be referred to as the rear side. A side on which an exhaust manifold 7 is disposed will be referred to as the left side. A side on which an intake manifold 6 is disposed will be referred to as the right side. For convenience sake, these are regarded as references of a relationship of left, right, front, rear, upper, and lower positions in the engine 1.

As shown in FIGS. 1 to 7, the engine 1 as a prime mover is mounted on a working machine such as a construction civil-engineering machine and an agricultural machine. The engine 1 includes a continuous-regeneration exhaust gas purifier 2 (DPF). The exhaust gas purifier 2 removes particulate matter (PM) contained in exhaust gas emitted from the engine 1 and also reduces carbon monoxide (CO) and hydrocarbon (HC) contained in the exhaust gas.

The engine 1 includes a cylinder block 4 accommodating the output shaft 3 (crank shaft) and pistons (not shown). A cylinder head 5 is mounted on the cylinder block 4. The intake manifold 6 is disposed on the right side surface of the cylinder head 5. The exhaust manifold 7 is disposed on the left side surface of the cylinder head 5. That is, the intake manifold 6 and the exhaust manifold 7 are separately located on both side surfaces of the engine 1 along the output shaft 3. A head cover 8 is disposed on the upper surface of the cylinder head 5. The cooling fan 9 is disposed on a side surface of the engine 1 that intersects the output shaft 3, specifically, on the front surface of the cylinder block 4. A mounting plate 10 is disposed on the rear surface of the cylinder block 4. The flywheel 11 is disposed over the mounting plate 10.

The flywheel 11 is axially supported on the output shaft 3. Motive power of the engine 1 is transmitted to an operation unit of the working machine through the output shaft 3. An oil pan 12 is disposed on the lower surface of the cylinder block 4. Lubrication oil in the oil pan 12 is supplied to lubrication portions of the engine 1 through an oil filter 13 disposed on the right side surface of the cylinder block 4.

A fuel supply pump 14 to supply fuel is attached to the right side surface of the cylinder block 4 that is above the oil filter 13 (below the intake manifold 6). The engine 1 includes injectors 15 for three cylinders provided with electromagnetic-switch control fuel injection valves (not shown). Each of the injectors 15 is coupled to a fuel tank (not shown) mounted on the working machine through the fuel supply pump 14, a cylindrical common rail 16, and a fuel filter (not shown).

Fuel in the fuel tank is supplied under pressure from the fuel supply pump 14 to the common rail 16 through the fuel filter (not shown). The high-pressure fuel is accumulated in the common rail 16. By switch control of the fuel injection valves of the injectors 15, the high-pressure fuel in the common rail 16 is injected from the injectors 15 to the respective cylinders of the engine 1. It should be noted that an engine starter 18 is disposed on the mounting plate 10. A pinion gear of the engine starter 18 meshes with a ring gear of the flywheel 11. When the engine 1 is started, torque of the starter 18 makes the ring gear of the flywheel 11 rotate to cause the output shaft 3 to start rotating (to execute so-called cranking).

A coolant pump 21 is disposed on the front side of the cylinder head 5 (on the cooling fan 9 side) to be coaxial with a fan shaft of the cooling fan 9. An alternator 23 is disposed on the left side of the engine 1, specifically on the left side of the coolant pump 21. The alternator 23 serves as a generator to generate electricity by motive power of the engine 1. Through a cooling fan driving V belt 22, rotation of the output shaft 3 drives not only the cooling fan 9 but also the coolant pump 21 and the alternator 23. A radiator 19 (see FIGS. 3 and 4) mounted on the working machine contains coolant. The coolant pump 21 is driven to supply the coolant to the cylinder block 4 and the cylinder head 5, thereby cooling the engine 1.

Engine leg attachment portions 24 are disposed on the left and right side surfaces of the oil pan 12. Engine legs (not shown) including rubber vibration isolators are respectively fastened by bolts to the engine leg attachment portions 24. In this embodiment, the oil pan 12 is clamped by a pair of left and right engine support chassis 25 in the working machine. The engine leg attachment portions 24 on the oil pan 12 side are fastened by bolts to the engine support chassis 25. Thus, both the engine support chassis 25 of the working machine support the engine 1.

As shown in FIGS. 4 to 7, an air cleaner (not shown) is coupled to an inlet portion of the intake manifold 6 through an EGR device 26 (exhaust gas recirculation device). The EGR device 26 is mainly disposed on the right side of the engine 1, specifically, on the right side of the cylinder head 5. Fresh air (outside air) drawn into the air cleaner is dusted and purified by the air cleaner. Then, through the EGR device 26, the fresh air is supplied to the intake manifold 6 to be supplied to the cylinders of the engine 1.

The EGR device 26 includes an EGR main body case 27, an intake throttle member 28, a recirculation exhaust gas pipe 30, and an EGR valve member 31. The EGR main body case 27 mixes part of exhaust gas of the engine 1 (EGR gas) with fresh air and supplies the mixture to the intake manifold 6. The intake throttle member 28 communicates the EGR main body case 27 with the air cleaner. The recirculation exhaust gas pipe 30 is coupled to the exhaust manifold 7 through an EGR cooler 29. The EGR valve member 31 communicates the EGR main body case 27 with the recirculation exhaust gas pipe 30.

Specifically, the intake throttle member 28 is coupled to the intake manifold 6 through the EGR main body case 27. An outlet side of the recirculation exhaust gas pipe 30 is coupled to the EGR main body case 27. An inlet side of the recirculation exhaust gas pipe 30 is coupled to the exhaust manifold 7 through the EGR cooler 29. An opening degree of an EGR valve in the EGR valve member 31 is controlled to regulate an amount of supply of EGR gas to the EGR main body case 27. It should be noted that the EGR main body case 27 is detachably fastened by bolts to the intake manifold 6.

In the above-described configuration, fresh air is supplied from the air cleaner into the EGR main body case 27 through the intake throttle member 28 whereas the EGR gas is supplied from the exhaust manifold 7 into the EGR main body case 27. After the fresh air from the air cleaner and the EGR gas from the exhaust manifold 7 is mixed in the EGR main body case 27, the mixed gas is supplied to the intake manifold 6. Part of exhaust gas emitted from the engine 1 to the exhaust manifold 7 is made to flow back from the intake manifold 6 to the engine 1. This lowers the maximum combustion temperature at the time of high-load driving, thus decreasing an emission volume of NOx (nitrogen oxide) from the engine 1.

On the upper side of the engine 1, the exhaust gas purifier 2 is disposed above the exhaust manifold 7, specifically, on the left side of the cylinder head 5 and above the exhaust manifold 7. In this case, the posture of the exhaust gas purifier 2 is set in such a manner that the longitudinal direction of the exhaust gas purifier 2 is parallel to the output shaft 3 of the engine 1. A purification inlet pipe 36 is disposed on an outer peripheral portion of the exhaust gas purifier 2 on the exhaust upstream side. The purification inlet pipe 36 is coupled to the outlet portion of the exhaust manifold 7. Exhaust gas discharged from the cylinders of the engine 1 to the exhaust manifold 7 is emitted to the outside through such components as the exhaust gas purifier 2.

Next, referring to FIGS. 8 to 12 in addition to FIGS. 1 to 7, a configuration of the exhaust gas purifier 2 will be described. The exhaust gas purifier 2 includes a purification casing 38 provided with the purification inlet pipe 36. Inside of the purification casing 38, a diesel oxidation catalyst 39 and a soot filter 40 are arranged in series in a direction of movement of exhaust gas. The diesel oxidation catalyst 39 is, for example, platinum, which generates nitrogen dioxide ($NO_2$). The soot filter 40 has a honeycomb structure to continuously oxidizes and removes collected particulate matter (PM) at relatively low temperature. The diesel oxidation catalyst 39 and the soot filter 40 are equivalent to a gas purification filter accommodated in the purification casing 38. It should be noted that, for example, a muffler or a tail pipe is coupled to an exhaust gas outlet 41 of the purification casing 38 through an exhaust pipe. Thus, the exhaust gas is emitted from the exhaust gas outlet 41 to the outside through the muffler or tail pipe.

In the above-described configuration, nitrogen dioxide ($NO_2$) generated by oxidation function of the diesel oxidation catalyst 39 is drawn into the soot filter 40. Particulate matter in exhaust gas of the engine 1 is collected by the soot filter 40, and the particulate matter is continuously oxidized and removed by nitrogen dioxide ($NO_2$). This ensures not only removal of the particulate matter (PM) from the exhaust gas of the engine 1 but also decreases of the carbon monoxide (CO) content and the hydrocarbon (HC) content in the exhaust gas of the engine 1.

The purification inlet pipe 36 is disposed on the outer peripheral portion of the purification casing 38 on the exhaust upstream side. In this embodiment, the purification inlet pipe 36 is formed to have a half cylindrical shape opening upwardly. A rectangular upwardly opening end portion of the purification inlet pipe 36 on a large diameter side is welded to an outer peripheral portion of the purification casing 38 to cover an exhaust gas inflow port (not shown) formed in the purification casing 38. The exhaust gas intake side of the purification inlet pipe 36 is located in the center of the longitudinal direction of the purification casing 38. The exhaust gas intake side of the purification inlet pipe 36 is fastened to the outlet portion of the exhaust manifold 7.

A lid member 42 is welded on an end portion of the purification casing 38 at the exhaust downstream side. The end portion of the purification casing 38 at the exhaust downstream side is covered with the lid member 42. An exhaust gas outlet 41 is opened approximately in the center of the lid member 42. An inlet-side lid member 43 is welded on an end portion of the purification casing 38 at the exhaust upstream side. The end portion of the purification casing 38 at the exhaust upstream side is covered with the inlet-side lid member 43.

The purification casing 38 includes an exhaust gas temperature sensor 57 of a thermistor. This embodiment provides a pair of exhaust gas temperature sensors 57 from each of which a sensor pipe 57a extends. Detection portions on distal ends of the sensor pipes 57a are inserted into the exhaust upstream side from the diesel oxidation catalyst 39 and between the diesel oxidation catalyst 39 and the soot filter 40 in order to detect exhaust gas temperatures in the spaces. The exhaust gas temperature sensors 57 convert the exhaust gas temperatures into electric signals to be output to an engine controller (not shown).

An exhaust pressure sensor 44 is attached to the purification casing 38. The exhaust pressure sensor 44 detects a difference between pressures of exhaust gas on the upstream side and the downstream side of the soot filter 40. The exhaust pressure sensor 44 converts the pressure difference of the exhaust gas into electric signals to be output to the engine controller (not shown). Based on the pressure difference of the exhaust gas between the upstream side and the downstream side of the soot filter 40, an amount of accumulation of particulate matter in the soot filter 40 is calculated to grasp a state of clogging in the soot filter 40.

Figure 18:
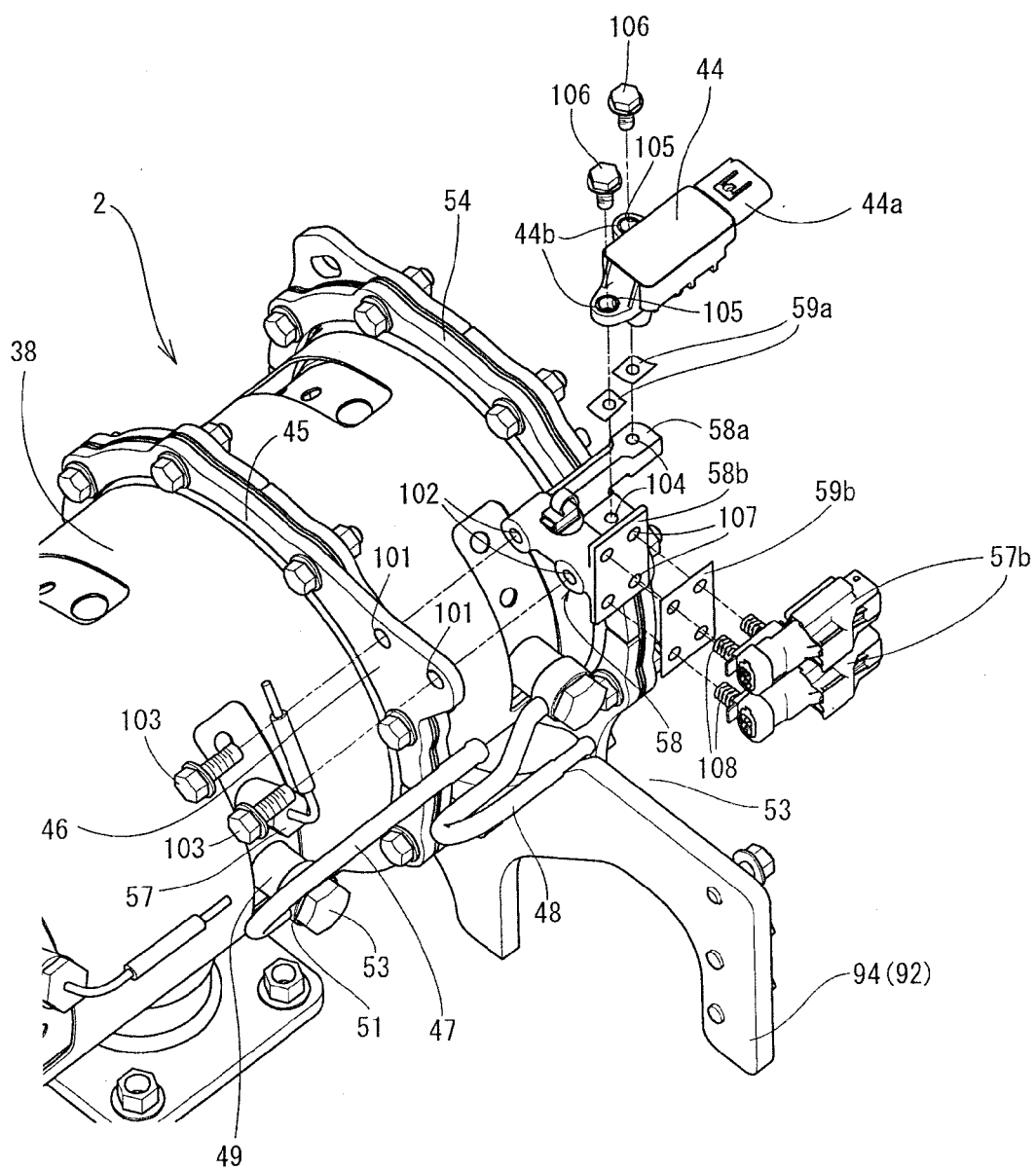
FIG. 18 is an exploded perspective view illustrating an attachment state of a sensor bracket and the electric wiring connectors of the exhaust pressure sensor and the exhaust gas temperature sensors.

A sensor fastening portion 46 with through holes 101 is disposed on an intermediate clamping flange 45 of the purification casing 38 and located on an outer peripheral portion of the purification casing 38 on the head cover 8 side. A sensor bracket 58 is detachably attached to the sensor fastening portion 46 of the intermediate clamping flange 45. In this case, a plurality of through holes 101 (two in this embodiment, see FIG. 18) are formed in the sensor fastening portion 46. Bolt holes 102 corresponding to the respective through holes 101 of the sensor fastening portion 46 are formed in the sensor bracket 58. Fastening bolts 103 inserted in the through holes 101 are tightened in the respective bolt holes 102 of the sensor bracket 58. Thus, the sensor bracket 58 and the sensor fastening portion 46 of the intermediate clamping flange 45 are fastened together. The exhaust pressure sensor 44 integral with an electric wiring connector 44a and electric wiring connectors 57b of the exhaust gas temperature sensors 57 are attached to the sensor bracket 58. In this case, the sensor bracket 58 is made of an approximately L-shaped aluminum plate and reduced in weight. The sensor bracket 58 corresponds to a heat conductive bracket.

Figure 17:
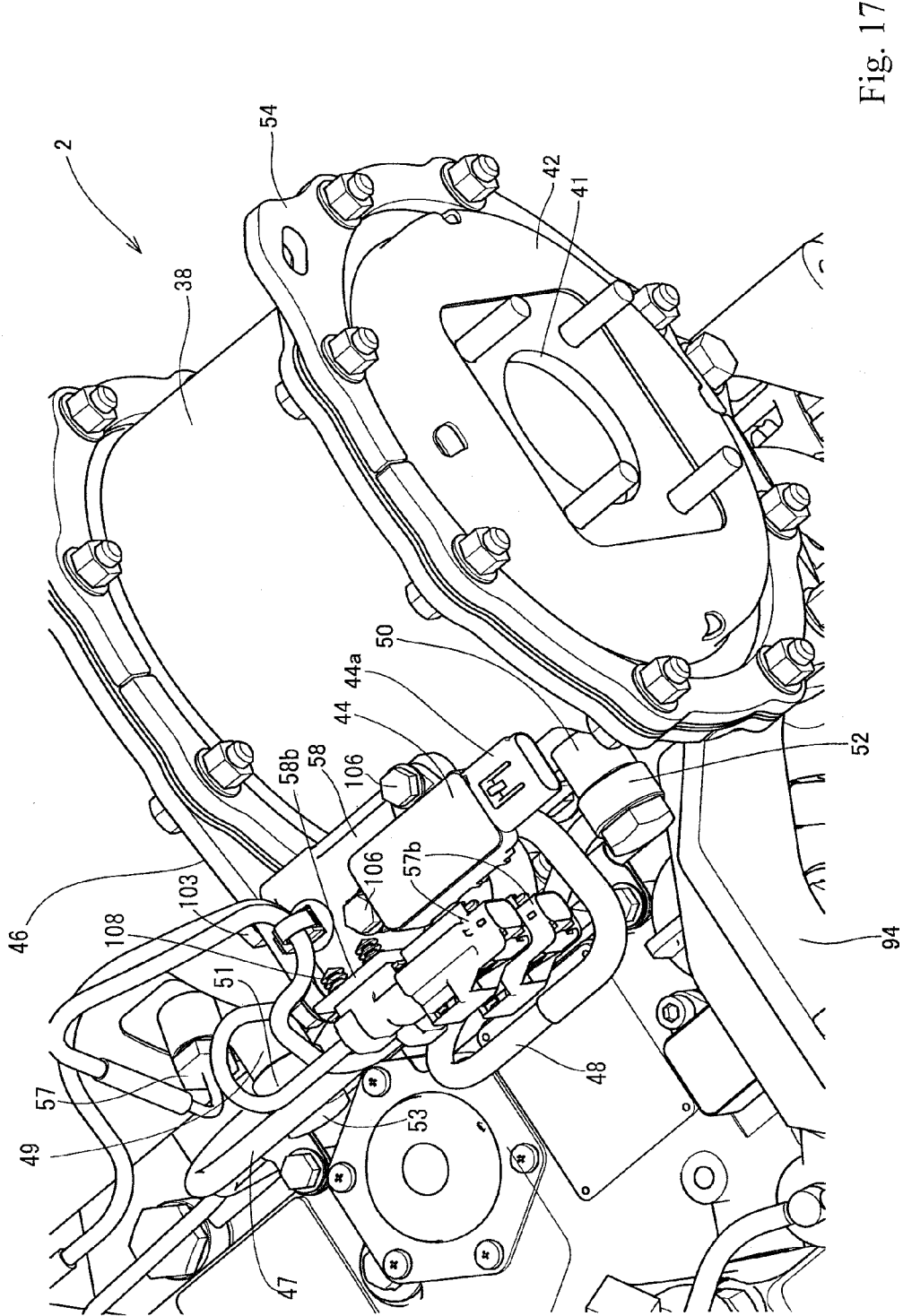
FIG. 17 is an enlarged perspective view illustrating an attachment state of electric wiring connectors of an exhaust pressure sensor and exhaust gas temperature sensors.

As shown in FIG. 17 in detail, the exhaust pressure sensor 44 is disposed on a horizontal plate portion 58a of the sensor bracket 58 through heat insulating and vibration isolating sheets 59a. The electric wiring connectors 57b of the exhaust gas temperature sensors 57 are disposed in the longitudinal direction on a vertical plate portion 58b of the sensor bracket 58 through a heat insulating and vibration isolating sheet 59b.

In this case, a plurality of screw holes 104 (two in this embodiment, see FIG. 18) are formed in the horizontal plate portion 58a of the sensor bracket 58. Insertion holes 105 corresponding to the respective screw holes 104 of the horizontal plate portion 58a are formed in protruding flange portions 44b of the exhaust pressure sensor 44. The heat insulating and vibration isolating sheets 59a are interposed between sections of the horizontal plate portion 58a that correspond to the screw holes 104 and the protruding flange portions 44b of the exhaust pressure sensor 44. Attachment bolts 106 inserted in the insertion holes 105 are tightened in the respective screw holes 104 of the sensor bracket 58. Thus, the exhaust pressure sensor 44 is fastened to the sensor bracket 58.

A plurality of attachment holes 107 (four in this embodiment, see FIG. 18) are formed in the vertical plate portion 58b of the sensor bracket 58. A plurality of coupling pins 108 (two in this embodiment, see FIG. 18) protrude from each of the electric wiring connectors 57b of the exhaust gas temperature sensors 57. The heat insulating and vibration isolating sheets 59b are interposed between the vertical plate portion 58b and the electric wiring connectors 57b of the exhaust gas temperature sensors 57. The coupling pins 108 of the electric wiring connectors 57b are enforcedly fitted in the respective attachment holes 107 of the vertical plate portion 58b. Thus, the electric wiring connectors 57b of the exhaust gas temperature sensors 57 are attached to the sensor bracket 58.

With this configuration, the electric wiring connectors 44a and 57b of the sensors 44 and 57 are gathered in one place to readily concentrate wiring with respect to the electric wiring connectors 44a and 57b. Wiring work is also facilitated.

One end of an upstream-side sensor pipe 47 and one end of a downstream-side sensor pipe 48 are coupled to the exhaust pressure sensor 44. The purification casing 38 is provided with upstream-side and downstream-side sensor pipe bosses 49 and 50 with the soot filter 40 in the purification casing 38 interposed between the sensor pipe bosses 49 and 50. Through pipe fitting bolts 53, fastening bosses 51 and 52 disposed on the other end of the sensor pipe 47 and the other end of the sensor pipe 48 are respectively fastened to the sensor pipe bosses 49 and 50.

In the above-described configuration, a difference between an exhaust gas pressure at the upstream (inflow) side of the soot filter 40 and an exhaust gas pressure at the downstream (outflow) side of the soot filter 40 (differential pressure of the exhaust gas) is detected by the exhaust pressure sensor 44. The residual amount of particulate matter in the exhaust gas collected by the soot filter 40 is proportional to the differential pressure of the exhaust gas. Consequently, when the residual amount of particulate matter in the soot filter 40 becomes equal to or larger than a predetermined value, restoration control (control for increasing the exhaust gas temperature, for example) is executed based on a detection result of the exhaust pressure sensor 44. Thus, the amount of the particulate matter in the soot filter 40 is reduced. Moreover, when the residual amount of the particulate matter further increases beyond a restoration controllable range, the purification casing 38 is detached and disassembled to clean the soot filter 40. Thus, maintenance work is performed to manually remove the particulate matter.

As described above, the electric wiring connectors 44a and 57b for the sensors 44 and 57 (detection members) with respect to the exhaust gas purifier 2 are located on the outer peripheral portion of the exhaust gas purifier 2 on the head cover 8 side. This allows the electric wiring connectors 44a and 57b to be positioned at a height approximately equal to or lower than an upper end of the exhaust gas purifier 2. Consequently, with respect to the overall height of the engine 1 including the exhaust gas purifier 2, an influence of the arrangement of the electric wiring connectors 44a and 57b is minimized or eliminated. This arrangement is effective for reducing the overall height of the engine 1 assembled with the exhaust gas purifier 2 as much as possible, which contributes to size reduction of the engine 1.

The exhaust gas purifier 2 is disposed on the upper side of the engine 1 and above the exhaust manifold 7, and supported on the cylinder head 5 and the exhaust manifold 7 in a posture to extend parallel to the output shaft 3 of the engine 1. This enables shipment of the engine 1 after assembled with the exhaust gas purifier 2. Using the cylinder head 5 and the exhaust manifold 7, which are components having high rigidity of the engine 1, the exhaust gas purifier 2 is supported highly rigidly to prevent damage of the exhaust gas purifier 2 due to vibration, for example. Furthermore, the exhaust gas purifier 2 is communicable with the exhaust manifold 7 at close range to maintain the exhaust gas purifier 2 at appropriate temperature. This ensures maintenance of high purification performance of the exhaust gas. As a result, the exhaust gas purifier 2 is reduced in size.

As is apparent from the above description and FIGS. 8 to 12, and 18, the engine apparatus includes the exhaust gas purifier 2 to purify exhaust gas from the engine 1. The exhaust gas purifier 2 is mounted above the engine 1 through the mounting base 71 and 72. The heat conductive bracket 58 is disposed on the outer surface of the exhaust gas purifier 2 that is closer to the engine 1. The plurality of detection members 44 and 57*b* to detect a state of the exhaust gas purifier 2 are attached to the upper surface 58*a* and the side surface 58*b* of the heat conductive bracket 58. Consequently, the plurality of detection members 44 and 57*b* such as a pressure sensor and a temperature sensor are concentrated on the outer surface of the exhaust gas purifier 2 that is closer to the engine 1. This facilitates concentration of wiring with respect to the plurality of detection members 44 and 57*b*. Also, wiring work is readily performed. The bracket 58 to which the plurality of detection members 44 and 57*b* are attached has heat conductivity to serve to decrease an influence of radiant heat.

The sensor fastening portion 46 is integrally formed on the portion of the flange 45 disposed on the exhaust gas purifier 2. The heat conductive bracket 58 is detachably attached to the sensor fastening portion 46. Consequently, the plurality of detection members 44 and 57*b* are supported on the highly rigid flange 45 through the heat conductive bracket 58 so as to reduce vibration of the plurality of detection members 44 and 57*b*. Also, the plurality of detection members 44 and 57*b* are prevented from coming off. In attachment of the plurality of detection members 44 and 57*b*, the plurality of detection members 44 and 57*b* are attached to the heat conductive bracket 58 in advance, and then, the heat conductive bracket 58 is fastened to the flange 45. This improves assembling workability of the plurality of detection members 44 and 57*b*.

The sensor fastening portion 46 of the flange 45 protrudes in the direction away from the outer surface of the exhaust gas purifier 2. The sensor fastening portion 46 and the heat conductive bracket 58 are fastened together by the fastening bolts 103. Therefore, the heat conductive bracket 58 is not in contact with the outer surface of the exhaust gas purifier 2 and is kept away from the outer surface of the exhaust gas purifier 2. This prevents disadvantageous influence of heat from the exhaust gas purifier 2 with respect to the sensor bracket 58 and at the same time the plurality of detection members 44 and 57*b*.

Moreover, the heat insulating and vibration isolating sheets 59*a* and 59*b* are interposed between the detection members 44 and 57*b* and the heat conductive bracket 58. The existence of the heat insulating and vibration isolating sheets 59*a* and 59*b* further reduces the influence of radiant heat on the plurality of detection members 44 and 57*b*. This also suppresses vibration of the plurality of detection members 44 and 57*b*. Thus, the possibility of disorder owing to heat and falls of wiring is prevented.

Next, referring to FIGS. 8 to 16, a configuration of assembling the engine 1 with the exhaust gas purifier 2 will be described. As described above, the exhaust gas inflow side of the purification inlet pipe 36 of the purification casing 38 is fastened to the outlet portion of the exhaust manifold 7. Exhaust gas of the exhaust manifold 7 is supplied to the exhaust gas purifier 2 through the purification inlet pipe 36. The exhaust manifold 7 also serves as a casing support body to support the exhaust gas purifier 2. In this case, the exhaust manifold 7 supports a middle portion of the purification casing 38 in the longitudinal direction through the purification inlet pipe 36.

As shown in FIGS. 8 to 10, and 16 in detail, the engine 1 includes an inlet-side bracket body 71 and an outlet-side bracket body 72 to support and secure the exhaust gas purifier 2. The inlet-side bracket body 71 and the outlet-side bracket body 72 are formed to be wide in a direction intersecting the output shaft 3 of the engine 1. The inlet-side bracket body 71 and the outlet-side bracket body 72 are detachably secured to the cylinder head 5 of the engine 1. The inlet-side bracket body 71 and the outlet-side bracket body 72 stand separately on the front side and the rear side of the cylinder head 5 in the direction intersecting the output shaft 3. The inlet-side bracket body 71, which is located on the rear side of the cylinder head 5, supports the exhaust upstream side of the purification casing 38. The outlet-side bracket body 72, which is located on the front side of the cylinder head 5, supports the exhaust downstream side of the purification casing 38. The inlet-side bracket body 71 and the outlet-side bracket body 72 are equivalent to mounting bases.

As shown in FIGS. 9, 12, and 14 to 16, as described above, the inlet-side bracket body 71 is located on the rear side of the cylinder head 5 (above the mounting plate 10). A lower end of the inlet-side bracket body 71 is fastened by bolts to a rear surface of the cylinder head 5. An extension bracket 76 is fastened by bolts to an upper end of the inlet-side bracket body 71. A distal end of the extension bracket 76 is fastened, through bolts and nuts, to the inlet-side lid member 43 to close the end portion of the purification casing 38 on the exhaust upstream side. As a result, the exhaust upstream side of the purification casing 38 is detachably secured to the rear surface of the cylinder head 5 through the inlet-side bracket body 71.

As shown in FIGS. 10 to 15, as described above, the outlet-side bracket body 72 is located on the front side of the cylinder head 5 (on the cooling fan 9 side). The outlet-side bracket body 72 in this embodiment is separated into an intake-side bracket 91 and an exhaust-side bracket 92.

A lower end of the intake-side bracket 91 is fastened by bolts to the front side of the cylinder head 5. A reinforcement bracket 93 is fastened by bolts to the upper surface of the intake manifold 6. The intake-side bracket 91 and the reinforcement bracket 93 are fastened by bolts to each other in such a manner that a front side of the reinforcement bracket 93 is disposed over a vertically middle portion of the rear surface of the intake-side bracket 91. It should be noted that a first hanger 81, which will be described later, is attached to a vertically middle portion of the front surface of the intake-side bracket 91. In this case, the first hanger 81, the intake-side bracket 91, and the reinforcement bracket 93 are fastened together in such a manner that the vertically middle portion of the intake-side bracket 91 is clamped between the reinforcement bracket 93 and the first hanger 81.

The exhaust-side bracket 92 includes a front frame 94 having an approximate C-shape opened downwardly. A rear frame 95 of a plate having a cross-section slightly folded horizontally in the middle is welded to a rear surface of the front frame 94. In this embodiment, a proximal end of the front frame 95 is fastened by bolts to a bracket fastening portion 54*a* of an outlet clamping flange 54 on the purification casing 38 through a spacer 96. That is, one end of the exhaust gas purifier 2 is coupled to the exhaust-side bracket 92. It should be noted that, depending on a mounting position of the exhaust gas purifier 2 with respect to the engine 1, one end of the exhaust gas purifier 2 may be coupled to the intake-side bracket 91.

As shown in FIGS. 10, 11, 13, and 15, a stud bolt 97 serving as an engagement shaft is disposed on a distal end side of the front frame 94 of the exhaust-side bracket 92. The stud bolt 97 protrudes forwardly from the front surface of the front frame 94. A provisional fastening notch 98 opened upwardly is formed in an upper end of the intake-side bracket 91. Specifically, a bolt hole for inserting the stud bolt 97 formed in the upper end of the intake-side bracket 91 is notched to be opened upwardly, thereby forming the provisional fastening notch 98. The stud bolt 97 of the front frame 94 is to engage with the provisional fastening notch 98 on the upper end of the intake-side bracket 91. A distal end of the front surface of the front frame 94 of the exhaust-side bracket 92 is disposed over the upper end of the rear surface of the intake-side bracket 91, and the stud bolt 97 is engaged with the provisional fastening notch 98. Thus, the exhaust-side bracket 92 with the purification casing 38 above is supported by the intake-side bracket 91.

The stud bolt 97 and the provisional fastening notch 98 are engaged with each other to hold the exhaust downstream side of the purification casing 38 at a predetermined position. Specifically, the engagement of the stud bolt 97 and the provisional fastening notch 98 facilitates positioning of the exhaust-side bracket 92 with respect to the intake-side bracket 91, and at the same time, positioning of the exhaust gas purifier 2 with respect to the engine 1. It should be noted that, contrary to this embodiment, the stud bolt 97 may be disposed on the intake-side bracket 91, and the provisional fastening notch 98 may be formed in the exhaust-side bracket 92. An opening direction of the provisional fastening notch 98 may be set based on the positional relationship with the stud bolt 97, and will not be limited to the upward direction.

Figure 15:
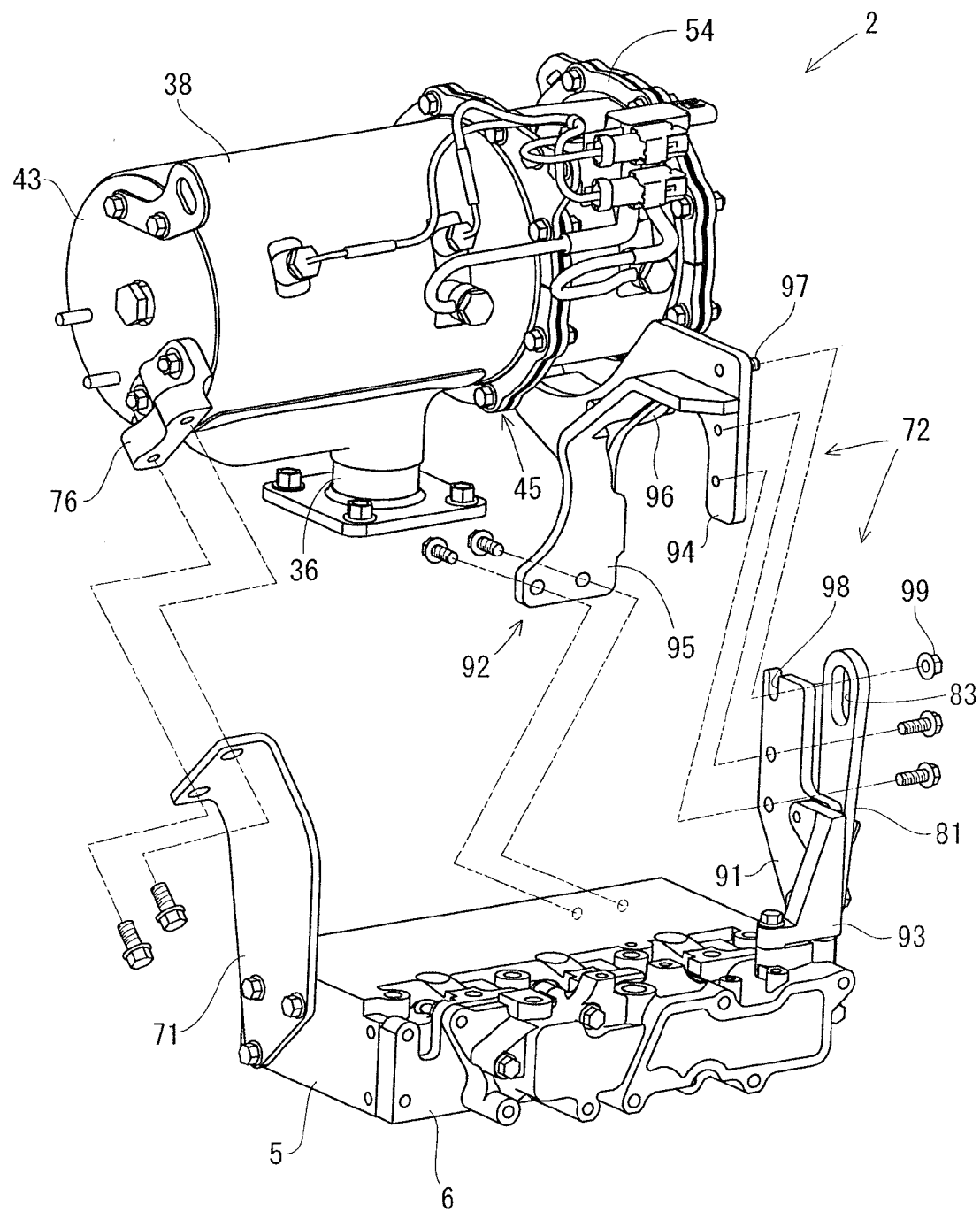
FIG. 15 is an exploded perspective view for describing, a state of attachment of the exhaust gas purifier.
Figure 16:
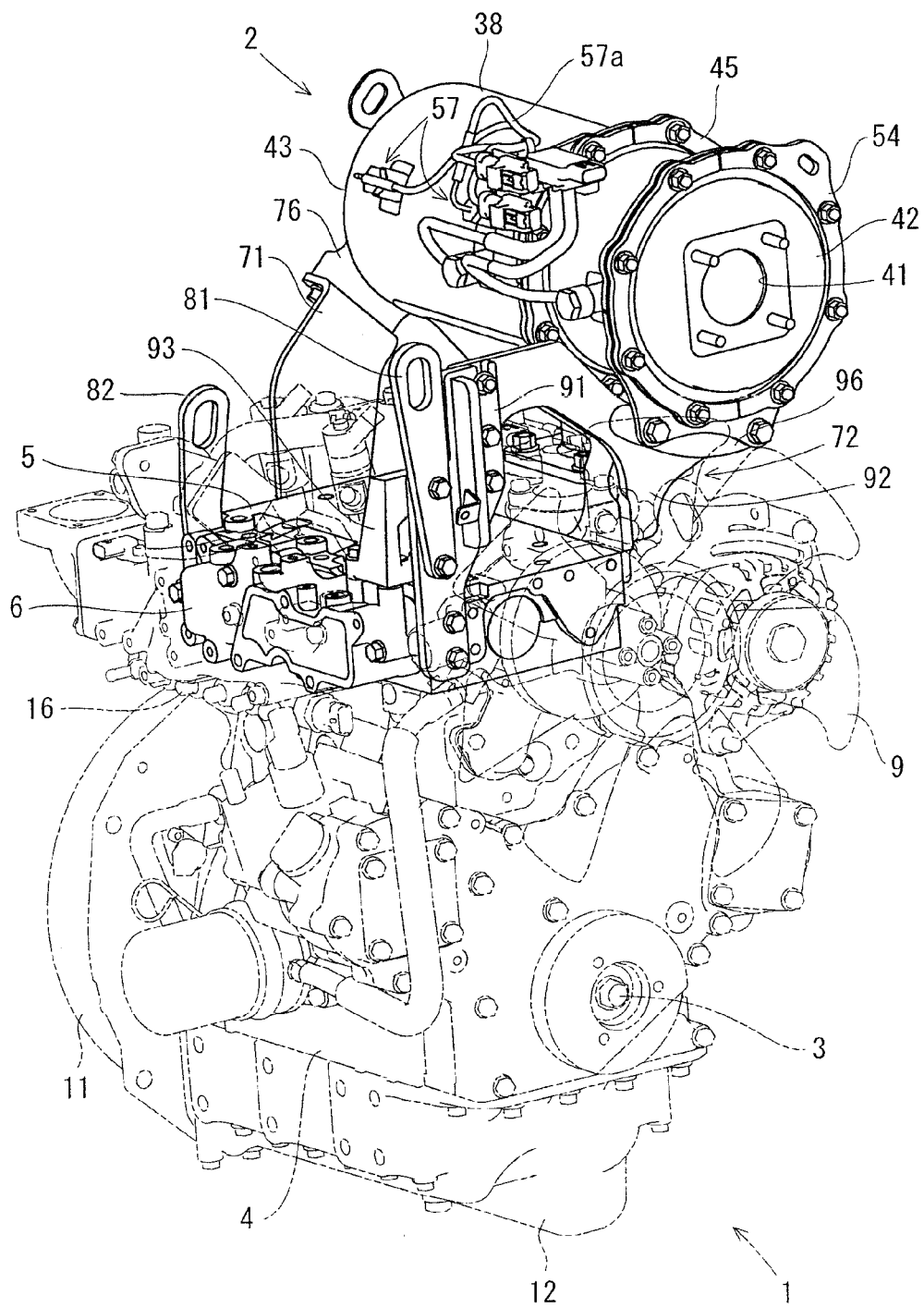
FIG. 16 is an upper front perspective view of the cylinder head and the exhaust gas purifier, illustrating a positional relationship between the cylinder head and the exhaust gas purifier.

As shown in FIG. 15, while the stud bolt 97 is engaged with the provisional fastening notch 98, the distal end of the front surface of the front frame 94 of the exhaust-side bracket 92 and the upper end of the rear surface of the intake-side bracket 91 are fastened to each other by bolts. Then, an engagement nut 99 is tightened on the stud bolt 97 (additional tightening is performed) to couple the one end of the intake-side bracket 91 and the one end of the exhaust-side bracket 92 to each other. The lower end of the rear frame 95 of the exhaust-side bracket 92 is fastened by bolts to a front portion of the left side surface of the cylinder head 5. As a result, the exhaust downstream side of the purification casing 38 is detachably secured to the front surface and the front portion of the left side surface (the front side) of the cylinder head 5 through the outlet-side bracket body 72.

With this configuration, the engagement of the stud bolt 97 and the provisional fastening notch 98 facilitates positioning of the exhaust-side bracket 92 with respect to the intake-side bracket 91, and at the same time, positioning of the exhaust gas purifier 2 with respect to the engine 1. Furthermore, there is no need to execute assembling operation such as bolt fastening and disassembling operation while sustaining the whole weight of the exhaust gas purifier 2. This significantly reduces labor and time at the time of mounting and dismounting operation of the exhaust gas purifier 2 and assembling and disassembling operation of the exhaust gas purifier 2.

As is apparent from the above description and FIGS. 10 to 15, the intake-side bracket 91 and the exhaust-side bracket 92 are provided as one of the mounting bases to support one end of the exhaust gas purifier 2 (outlet-side bracket body 72). The one end of the intake-side bracket 91 and the one end of the exhaust-side bracket 92 are fastened to each other whereas the other end of the intake-side bracket 91 and the other end of the exhaust-side bracket 92 are coupled to the engine 1 (cylinder head 5) side. Consequently, the mounting base (outlet-side bracket body 72) is separated into the intake-side bracket 91 and the exhaust-side bracket 92. While the brackets 91 and 92 as single parts are reduced in weight, the brackets 91 and 92 are fastened to each other to secure a sufficient strength of support, which enables the exhaust gas purifier 2 to be stably mounted on the engine 1. This therefore prevents degradation and damage of the exhaust gas purifier 2 due to vibration of the engine 1, for example. Thus, durability of the exhaust gas purifier 2 is improved.

As is apparent from the above description and FIGS. 10 to 15, one end of the exhaust gas purifier 2 is coupled to one of the intake-side bracket 91 and the exhaust-side bracket 92. Consequently, the exhaust gas purifier 2 is mounted on or dismounted from the engine 1 while one of the intake-side bracket 91 and the exhaust-side bracket 92 is coupled to the one end of the exhaust gas purifier 2. This improves assembling workability of the exhaust gas purifier 2 with respect to the engine 1. Moreover, the other of the intake-side bracket 91 and the exhaust-side bracket 92 may be used for a mounting base of the hanger 81 to hang the engine 1.

As is apparent from the above description and FIGS. 10 to 15, the provisional fastening notch 98 is formed in one of the intake-side bracket 91 and the exhaust-side bracket 92. The engagement shaft 97, which is disposed on the other of the intake-side bracket 91 and the exhaust-side bracket 92, is to engage with the provisional fastening notch 98. Therefore, the engagement of the engagement shaft 97 and the provisional fastening notch 98 facilitates positioning of one of the brackets 91 (92) with respect to the other bracket 92 (91), and at the same time, positioning of the exhaust gas purifier 2 with respect to the engine 1. Furthermore, there is no need to execute assembling operation such as bolt fastening and disassembling operation while sustaining the whole weight of the exhaust gas purifier 2. This significantly reduces labor and time at the time of mounting and dismounting operation of the exhaust gas purifier 2 and assembling and disassembling operation of the exhaust gas purifier 2.

In particular, as described above, the lower ends of the inlet-side bracket body 71 and the outlet-side bracket body 72 are fastened to the cylinder head 5 to set a mounting reference position of the exhaust gas purifier 2 with respect to the engine 1 highly accurately. Therefore, although the exhaust gas purifier 2 has a larger weight than a post-processing device such as a muffler, the exhaust gas purifier 2 is mounted at a predetermined position appropriately.

Next, referring to FIGS. 6 to 12, and 16, hangers 81 and 82 used for mounting and dismounting the engine 1 on and from the working machine and an attachment configuration of the hangers 81 and 82 will be described. The engine 1 in this embodiment includes a pair of hangers 81 and 82. In order to lift the engine 1 with the exhaust gas purifier 2, which has a large weight, in a stable posture (in a balanced manner), the pair of hangers 81 and 82 are separately disposed on both sides of the engine 1 in a direction intersecting the output shaft 3. The pair of hangers 81 and 82 in this embodiment are separately disposed on the front side and the rear side of the cylinder head 5 of the engine 1. Of the pair of hangers 81 and 82, the second hanger 82 is made of a longitudinal metal plate. A through hanging hole 86 through which, for example, wire rope is inserted is formed in an upper end of the second hanger 82. A lower end of the second hanger 82 is fastened by bolts to the rear surface of the cylinder head 5.

The first hanger 81 is also made of a longitudinal metal plate. A through hanging hole 83 through which, for example, wire rope is inserted is formed in an upper end of the first hanger 81. The lower end of the second hanger 82 is fastened by bolts to the rear surface of the cylinder head 5. A lower end of the first hanger 81 is fastened by bolts to the intake-side bracket 91. In this case, the reinforcement bracket 93 fastened by bolts to the upper surface of the intake manifold 6 and the lower end of the first hanger 81 clamp a vertically middle portion of the intake-side bracket 91. In this clamped state, the first hanger 81, the intake-side bracket 91, and the reinforcement bracket 93 are fastened together. It should be noted that, contrary to this embodiment, the first hanger 81 may be disposed on the exhaust-side bracket 92.

The strength of the first hanger 81 is set to be smaller than strengths of the intake-side bracket 91 and the reinforcement bracket 93. When an excessively large external force is exerted at the time of, for example, lifting the engine 1, plastic deformation or breakage of the first hanger 81 may be induced faster than the intake-side bracket 91 and the reinforcement bracket 93. This setting of strength of the first hanger 81 prevents deformations of the intake-side bracket 91 and the reinforcement bracket 93 by lifting of the engine 1. As a result, exertion of external force on the exhaust gas purifier 2 is minimized at the time of lifting of the engine 1.

In the above-described configuration, when the engine 1 is mounted on and dismounted from the working machine, wire rope, for example, is inserted through the through hanging holes 83 and 86 formed in the first and second hangers 81 and 82, and the wire rope is engaged with such a component as a hook of a chain block. Thus, the engine 1 is lifted.

As is apparent from the above description and FIGS. 6 to 10, the lower end of the hanger 81 to lift the engine 1 is fastened to one of the intake-side bracket 91 and the exhaust-side bracket 92. Consequently, one of these two brackets 91 and 92, which are highly rigid components to support the exhaust gas purifier 2, is also used for a fastening portion of the hanger 81. This reduces the number of components, and at the same time, the hanger 81 is firmly fastened to the engine 1 (the coupling strength of the hanger 81 with respect to the engine 1 is secured).

It should be noted that the configurations of the components of the present invention should not be limited to the embodiment illustrated in the drawings. Various modifications are possible within the scope of the present invention.

DESCRIPTION OF THE REFERENCE NUMERALS

1 Engine
2 Exhaust gas purifier
3 Output shaft
4 Cylinder block
5 Cylinder head
6 Intake manifold
7 Exhaust manifold
8 Head cover
9 Cooling fan
44 Exhaust pressure sensor (detection member)
57 Exhaust gas temperature sensor (detection member)
57b Electric wiring connector (detection member)
58 Sensor bracket (heat conductive bracket)
58a Horizontal plate portion
58b Vertical plate portion
59a, 59b Heat insulating and vibration isolating sheet
71 Inlet-side bracket body (mounting base)
72 Outlet-side bracket body (mounting base)
81 First hanger
82 Second hanger
91 Intake-side bracket
92 Exhaust-side bracket
97 Stud bolt
98 Provisional fastening notch

The invention claimed is:

1. An engine apparatus, comprising:
an exhaust gas purifier configured to purify exhaust gas from an engine and mounted above the engine through a mounting base, wherein
an L-shaped heat conductive bracket is disposed on an outer surface of the exhaust gas purifier that is closer to the engine,
a sensor fastening portion is integrally formed on a portion of a flange disposed on the exhaust gas purifier, the heat conductive bracket being detachably attached to the sensor fastening portion,
on a horizontal plate portion of an upper surface of the heat conductive bracket is affixed an exhaust pressure sensor for detecting pressure of the exhaust gas of the exhaust gas purifier,
on a vertical plate portion on a side surface of the heat conductive bracket is affixed an exhaust gas temperature sensor that detects temperature of the exhaust gas of the exhaust gas purifier, and
on the heat conductive bracket, each of the horizontal plate portion, the vertical plate portion, and the sensor fastening portion have fastening surfaces oriented in differing directions relative to each other.

2. The engine apparatus according to claim 1, wherein the sensor fastening portion of the flange protrudes in a direction away from the outer surface of the exhaust gas purifier, the sensor fastening portion and the heat conductive bracket being fastened together by fastening bolts.

3. The engine apparatus according to claim 1, wherein heat insulating and vibration isolating sheets are interposed between the detection members and the heat conductive bracket.

4. The engine apparatus according to claim 2, wherein heat insulating and vibration isolating sheets are interposed between the detection members and the heat conductive bracket.

* * * * *